United States Patent
Mese et al.

(10) Patent No.: US 8,761,080 B2
(45) Date of Patent: *Jun. 24, 2014

(54) MULTIPLE OTHER SECTOR INFORMATION COMBINING FOR POWER CONTROL IN A WIRELESS COMMUNICATION SYSTEM

(75) Inventors: Murat Mese, Rancho Palos Verdes, CA (US); Arak Sutivong, Bangkok (TH)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/621,843

(22) Filed: Nov. 19, 2009

(65) Prior Publication Data
US 2010/0069107 A1    Mar. 18, 2010

Related U.S. Application Data

(63) Continuation of application No. 11/376,772, filed on Mar. 15, 2006, now Pat. No. 7,742,444.

(51) Int. Cl.
*H04B 7/185* (2006.01)
(52) U.S. Cl.
USPC ........... 370/318; 370/328; 370/335; 370/342; 370/278; 455/522; 455/13.4; 455/69
(58) Field of Classification Search
USPC .......... 455/522, 69, 13.4, 504, 509, 434, 450, 455/452.2, 67.11, 296; 370/318, 336, 278, 370/431, 235, 280, 328, 335, 342
See application file for complete search history.

(56) References Cited

U.S. PATENT DOCUMENTS

| | | |
|---|---|---|
| 5,021,777 A | 6/1991 | Gross et al. |
| 5,196,728 A | 3/1993 | Jaux |
| 5,267,261 A | 11/1993 | Blakeney, II et al. |
| 5,276,911 A | 1/1994 | Levine et al. |
| 5,289,527 A | 2/1994 | Tiedemann, Jr. |
| 5,363,426 A | 11/1994 | Nyhart |
| 5,406,613 A | 4/1995 | Peponides et al. |
| 5,490,139 A | 2/1996 | Baker et al. |
| 5,640,414 A | 6/1997 | Blakeney, II et al. |
| 5,678,192 A | 10/1997 | Paavonen et al. |
| 5,802,467 A | 9/1998 | Salazar et al. |

(Continued)

FOREIGN PATENT DOCUMENTS

| | | |
|---|---|---|
| CA | 2340201 | 4/2006 |
| CN | 1346580 A | 4/2002 |

(Continued)

OTHER PUBLICATIONS

International Search Report—PCT/US06/009549, International Search Authority—European Patent Office—Jun. 20, 2006.

(Continued)

*Primary Examiner* — Shaima Q Aminzay
(74) *Attorney, Agent, or Firm* — Thien T. Nguyen

(57) ABSTRACT

Techniques for adjusting transmit power to mitigate both intra-sector interference to a serving base station and inter-sector interference to neighbor base stations are described. This may be done by combining interference information from multiple base stations.

37 Claims, 8 Drawing Sheets

(56) References Cited

U.S. PATENT DOCUMENTS

| | | |
|---|---|---|
| 5,815,507 A | 9/1998 | Vinggaard et al. |
| 5,818,825 A | 10/1998 | Corrigan et al. |
| 5,818,842 A | 10/1998 | Burwell et al. |
| 5,825,752 A | 10/1998 | Fujimori et al. |
| 5,878,033 A | 3/1999 | Mouly |
| 5,913,168 A | 6/1999 | Moreau et al. |
| 5,946,292 A | 8/1999 | Tsujishita et al. |
| 6,006,073 A | 12/1999 | Glauner et al. |
| 6,012,160 A | 1/2000 | Dent |
| 6,038,220 A | 3/2000 | Kang et al. |
| 6,047,189 A | 4/2000 | Yun et al. |
| 6,088,345 A | 7/2000 | Sakoda et al. |
| 6,115,667 A | 9/2000 | Nakamura |
| 6,118,767 A | 9/2000 | Shen et al. |
| 6,119,005 A | 9/2000 | Smolik |
| 6,128,290 A | 10/2000 | Carvey |
| 6,138,034 A | 10/2000 | Willey |
| 6,144,841 A | 11/2000 | Feeney |
| 6,144,861 A | 11/2000 | Sundelin |
| 6,154,659 A | 11/2000 | Jalali et al. |
| 6,157,621 A | 12/2000 | Brown et al. |
| 6,167,248 A | 12/2000 | Hamalainen et al. |
| 6,169,768 B1 | 1/2001 | Okada et al. |
| 6,175,550 B1 | 1/2001 | Van Nee |
| 6,175,557 B1 | 1/2001 | Diachina et al. |
| 6,181,738 B1 | 1/2001 | Chheda et al. |
| 6,208,699 B1 | 3/2001 | Chen et al. |
| 6,212,175 B1 | 4/2001 | Harsch |
| 6,216,004 B1 | 4/2001 | Tiedemann, Jr. et al. |
| 6,229,800 B1 | 5/2001 | Thompson et al. |
| 6,249,681 B1 | 6/2001 | Virtanen |
| 6,252,865 B1 | 6/2001 | Walton et al. |
| 6,266,529 B1 | 7/2001 | Chheda |
| 6,272,335 B1 | 8/2001 | Nakayama et al. |
| 6,278,882 B1 | 8/2001 | Choi |
| 6,300,864 B1 | 10/2001 | Willey |
| 6,307,846 B1 | 10/2001 | Willey |
| 6,320,855 B1 | 11/2001 | Shi |
| 6,359,900 B1 | 3/2002 | Dinakar et al. |
| 6,366,779 B1 | 4/2002 | Bender et al. |
| 6,369,447 B2 | 4/2002 | Mori |
| 6,389,034 B1 | 5/2002 | Guo et al. |
| 6,421,540 B1 | 7/2002 | Gilhousen et al. |
| 6,446,236 B1 | 9/2002 | McEwen et al. |
| 6,477,361 B1 | 11/2002 | LaGrotta et al. |
| 6,480,504 B1 | 11/2002 | Wang et al. |
| 6,483,826 B1 | 11/2002 | Akerberg |
| 6,493,338 B1 | 12/2002 | Preston et al. |
| 6,519,705 B1 | 2/2003 | Leung |
| 6,532,227 B1 | 3/2003 | Leppisaari et al. |
| 6,535,736 B1 | 3/2003 | Balogh et al. |
| 6,539,030 B1 | 3/2003 | Bender et al. |
| 6,560,774 B1 | 5/2003 | Gordon et al. |
| 6,563,807 B1 | 5/2003 | Kim et al. |
| 6,570,915 B1 | 5/2003 | Sweitzer et al. |
| 6,571,084 B1 | 5/2003 | Jabbary |
| 6,577,608 B1 | 6/2003 | Moon et al. |
| 6,580,726 B1 | 6/2003 | Kumpf et al. |
| 6,597,705 B1 | 7/2003 | Rezaiifar et al. |
| 6,597,923 B1 | 7/2003 | Vanghi et al. |
| 6,603,746 B1 | 8/2003 | Larijani et al. |
| 6,628,956 B2 | 9/2003 | Bark et al. |
| 6,633,554 B1 | 10/2003 | Dalal |
| 6,643,520 B1 | 11/2003 | Park et al. |
| 6,684,080 B1 | 1/2004 | Barnes et al. |
| 6,687,285 B1 | 2/2004 | Jou |
| 6,711,150 B1 | 3/2004 | Vanghi et al. |
| 6,714,511 B1 | 3/2004 | Sudo et al. |
| 6,721,373 B1 | 4/2004 | Frenkel et al. |
| 6,731,943 B1 | 5/2004 | McCormick et al. |
| 6,754,229 B1 | 6/2004 | Islam et al. |
| 6,788,937 B1 | 9/2004 | Willenegger et al. |
| 6,795,425 B1 | 9/2004 | Raith |
| 6,807,164 B1 | 10/2004 | Almgren et al. |
| 6,813,252 B2 | 11/2004 | Chang et al. |
| 6,813,269 B1 | 11/2004 | Clougherty et al. |
| 6,823,192 B2 | 11/2004 | Jou et al. |
| 6,829,493 B1 | 12/2004 | Hunzinger |
| 6,842,619 B2 | 1/2005 | Lee et al. |
| 6,850,499 B2 | 2/2005 | Wheatley, III |
| 6,928,293 B2 | 8/2005 | Park et al. |
| 6,937,700 B2 | 8/2005 | Jang |
| 6,944,146 B1 | 9/2005 | Barany et al. |
| 6,950,669 B2 | 9/2005 | Simonsson |
| 6,952,591 B2 | 10/2005 | Budka et al. |
| 6,963,540 B2 | 11/2005 | Choi et al. |
| 6,967,936 B1 | 11/2005 | Laroia et al. |
| 6,996,131 B1 | 2/2006 | Islam et al. |
| 6,996,391 B2 | 2/2006 | Hunzinger |
| 7,006,477 B1 | 2/2006 | Balachandran et al. |
| 7,046,966 B2 | 5/2006 | Davis |
| 7,058,031 B2 | 6/2006 | Bender et al. |
| 7,072,307 B2 | 7/2006 | Tong et al. |
| 7,099,299 B2 | 8/2006 | Liang et al. |
| 7,110,391 B1 | 9/2006 | Rogers et al. |
| 7,139,575 B1 | 11/2006 | Chen et al. |
| 7,197,692 B2 | 3/2007 | Sutivong et al. |
| 7,203,512 B2 | 4/2007 | Jeong et al. |
| 7,212,831 B2 | 5/2007 | Lee |
| 7,224,993 B2 | 5/2007 | Meyers et al. |
| 7,233,625 B2 | 6/2007 | Ma et al. |
| 7,313,167 B2 | 12/2007 | Yoon et al. |
| 7,313,398 B1 | 12/2007 | Ramahi |
| 7,320,003 B2 | 1/2008 | Perry et al. |
| 7,336,953 B2 | 2/2008 | Kim et al. |
| 7,340,615 B2 | 3/2008 | Krantz et al. |
| 7,342,901 B1 | 3/2008 | Zhang et al. |
| 7,383,432 B1 | 6/2008 | Barnes et al. |
| 7,403,528 B2 | 7/2008 | Hu et al. |
| 7,415,041 B2 | 8/2008 | Harris |
| 7,420,939 B2 | 9/2008 | Laroia et al. |
| 7,466,665 B2 | 12/2008 | Calcev et al. |
| 7,496,058 B2 | 2/2009 | Kim et al. |
| 7,522,919 B2 | 4/2009 | Yoon et al. |
| 7,567,826 B2 | 7/2009 | Sugaya |
| 7,590,095 B2 | 9/2009 | Chen et al. |
| 7,620,018 B2 | 11/2009 | Tee et al. |
| 7,742,444 B2 | 6/2010 | Mese et al. |
| 7,768,960 B1 | 8/2010 | Barratt |
| 7,782,807 B2 | 8/2010 | Yoon et al. |
| 7,782,831 B1 | 8/2010 | Feeney |
| 7,818,013 B2 | 10/2010 | Li et al. |
| 7,852,793 B2 | 12/2010 | Prakash |
| 7,855,976 B2 | 12/2010 | Sampath |
| 7,881,245 B2 | 2/2011 | Vijayan et al. |
| 7,924,800 B2 | 4/2011 | Sampath |
| 7,933,219 B2 | 4/2011 | Naguib |
| 7,957,483 B2 | 6/2011 | Yu et al. |
| 7,987,505 B2 | 7/2011 | Vadlapudi et al. |
| 8,000,257 B2 | 8/2011 | An et al. |
| 8,000,407 B2 | 8/2011 | Prakash |
| 8,014,749 B2 | 9/2011 | Prakash |
| 8,027,302 B2 | 9/2011 | Prakash et al. |
| 8,032,145 B2 | 10/2011 | Ji |
| 8,036,669 B2 | 10/2011 | Dong et al. |
| 8,078,135 B2 | 12/2011 | Prakash et al. |
| 8,089,893 B2 | 1/2012 | Naguib |
| 8,107,421 B2 | 1/2012 | Prakash et al. |
| 8,169,889 B2 | 5/2012 | Walton et al. |
| 8,265,066 B2 | 9/2012 | Prakash et al. |
| 8,289,908 B2 | 10/2012 | Barriac |
| 8,411,621 B2 | 4/2013 | Barriac |
| 8,457,042 B2 | 6/2013 | Prakash et al. |
| 8,457,092 B2 | 6/2013 | Agrawal et al. |
| 8,477,808 B2 | 7/2013 | Prakash et al. |
| 2001/0029181 A1 | 10/2001 | Verkama |
| 2001/0034233 A1 | 10/2001 | Tiedemann, Jr. et al. |
| 2001/0054959 A1 | 12/2001 | Horn et al. |
| 2002/0003780 A1 | 1/2002 | Braun et al. |
| 2002/0018010 A1 | 2/2002 | Le |
| 2002/0018450 A1 | 2/2002 | McKenna et al. |
| 2002/0022487 A1 | 2/2002 | Ahn |
| 2002/0037716 A1 | 3/2002 | McKenna et al. |
| 2002/0058528 A1 | 5/2002 | Hunzinger |

(56) References Cited

U.S. PATENT DOCUMENTS

| | | |
|---|---|---|
| 2002/0061749 A1 | 5/2002 | Hunzinger |
| 2002/0087720 A1 | 7/2002 | Davis et al. |
| 2002/0093920 A1 | 7/2002 | Neufeld et al. |
| 2002/0101837 A1 | 8/2002 | Bender et al. |
| 2002/0111158 A1 | 8/2002 | Tee |
| 2002/0123358 A1 | 9/2002 | Butler et al. |
| 2002/0126641 A1 | 9/2002 | Bender |
| 2002/0136286 A1 | 9/2002 | Koo |
| 2002/0137535 A1 | 9/2002 | Hunzinger |
| 2002/0142776 A1 | 10/2002 | Tiedemann, Jr. |
| 2002/0154610 A1 | 10/2002 | Tiedemann et al. |
| 2002/0155852 A1 | 10/2002 | Bender |
| 2002/0163894 A1 | 11/2002 | Alapuranen et al. |
| 2002/0168984 A1 | 11/2002 | Wallentin |
| 2002/0181423 A1 | 12/2002 | Chen et al. |
| 2002/0181509 A1 | 12/2002 | Mody et al. |
| 2003/0016702 A1 | 1/2003 | Bender et al. |
| 2003/0031140 A1 | 2/2003 | Oprescu-Surcobe et al. |
| 2003/0039267 A1 | 2/2003 | Koo et al. |
| 2003/0058818 A1 | 3/2003 | Wilkes et al. |
| 2003/0072452 A1 | 4/2003 | Mody |
| 2003/0086366 A1 | 5/2003 | Branlund et al. |
| 2003/0086385 A1 | 5/2003 | Kwon et al. |
| 2003/0112829 A1 | 6/2003 | Sridhar |
| 2003/0115369 A1 | 6/2003 | Walter et al. |
| 2003/0123383 A1 | 7/2003 | Korobkov et al. |
| 2003/0133494 A1 | 7/2003 | Bender et al. |
| 2003/0144000 A1 | 7/2003 | Glazko et al. |
| 2003/0152049 A1 | 8/2003 | Turner |
| 2003/0179727 A1 | 9/2003 | Soong et al. |
| 2003/0189932 A1 | 10/2003 | Ishikawa et al. |
| 2003/0207692 A1 | 11/2003 | Goldberg |
| 2003/0218973 A1 | 11/2003 | Oprea et al. |
| 2003/0232621 A1 | 12/2003 | Brooks |
| 2004/0002340 A1 | 1/2004 | Lim et al. |
| 2004/0038681 A1 | 2/2004 | Chun |
| 2004/0077370 A1 | 4/2004 | Dick et al. |
| 2004/0081131 A1 | 4/2004 | Walton et al. |
| 2004/0082356 A1 | 4/2004 | Walton et al. |
| 2004/0121771 A1 | 6/2004 | Song et al. |
| 2004/0121774 A1 | 6/2004 | Rajkotia et al. |
| 2004/0127244 A1 | 7/2004 | Matsumoto et al. |
| 2004/0143791 A1 | 7/2004 | Ito et al. |
| 2004/0146030 A1 | 7/2004 | Hsieh et al. |
| 2004/0151231 A1 | 8/2004 | Li et al. |
| 2004/0151264 A1 | 8/2004 | Montojo et al. |
| 2004/0152481 A1 | 8/2004 | Georgeaux et al. |
| 2004/0160922 A1 | 8/2004 | Nanda et al. |
| 2004/0174928 A1 | 9/2004 | Siwiak et al. |
| 2004/0180661 A1 | 9/2004 | Chen et al. |
| 2004/0185879 A1 | 9/2004 | Kong et al. |
| 2004/0193971 A1 | 9/2004 | Soong et al. |
| 2004/0203855 A1 | 10/2004 | Veerasamy et al. |
| 2004/0213214 A1 | 10/2004 | Jung et al. |
| 2004/0221218 A1 | 11/2004 | Grob et al. |
| 2004/0229605 A1 | 11/2004 | Hwang et al. |
| 2004/0252659 A1 | 12/2004 | Yun et al. |
| 2004/0258096 A1 | 12/2004 | Yoon et al. |
| 2004/0259528 A1 | 12/2004 | Gandhi et al. |
| 2004/0264548 A1 | 12/2004 | Miyoshi |
| 2005/0002370 A1 | 1/2005 | An et al. |
| 2005/0030911 A1 | 2/2005 | Tiedemann et al. |
| 2005/0031047 A1 | 2/2005 | Maltsev et al. |
| 2005/0047361 A1 | 3/2005 | Fudim et al. |
| 2005/0049013 A1 | 3/2005 | Chang et al. |
| 2005/0054389 A1 | 3/2005 | Lee et al. |
| 2005/0058089 A1 | 3/2005 | Vijayan et al. |
| 2005/0063298 A1 | 3/2005 | Ling et al. |
| 2005/0078641 A1 | 4/2005 | Kim |
| 2005/0094576 A1 | 5/2005 | Fonseca, Jr. et al. |
| 2005/0111397 A1 | 5/2005 | Attar et al. |
| 2005/0111406 A1 | 5/2005 | Pasanen et al. |
| 2005/0113023 A1 | 5/2005 | Bassompiere et al. |
| 2005/0117537 A1 | 6/2005 | Okabe |
| 2005/0118981 A1 | 6/2005 | Laroia et al. |
| 2005/0124358 A1 | 6/2005 | Willey |
| 2005/0124362 A1 | 6/2005 | Pecen et al. |
| 2005/0128964 A1 | 6/2005 | Tiedemann, Jr. et al. |
| 2005/0128993 A1 | 6/2005 | Yu et al. |
| 2005/0135282 A1 | 6/2005 | Miyoshi et al. |
| 2005/0135308 A1 | 6/2005 | Vijayan et al. |
| 2005/0135403 A1 | 6/2005 | Ketchum et al. |
| 2005/0152328 A1 | 7/2005 | Sadri et al. |
| 2005/0157802 A1 | 7/2005 | Park et al. |
| 2005/0163258 A1 | 7/2005 | Gore et al. |
| 2005/0164709 A1 | 7/2005 | Balasubramanian et al. |
| 2005/0165949 A1 | 7/2005 | Teague |
| 2005/0180312 A1 | 8/2005 | Walton et al. |
| 2005/0180362 A1 | 8/2005 | Chin et al. |
| 2005/0190724 A1 | 9/2005 | Hansen et al. |
| 2005/0201309 A1 | 9/2005 | Kang et al. |
| 2005/0221833 A1 | 10/2005 | Granzow et al. |
| 2005/0232181 A1 | 10/2005 | Park et al. |
| 2005/0233729 A1 | 10/2005 | Stojanovski et al. |
| 2005/0249181 A1 | 11/2005 | Vijayan et al. |
| 2005/0249187 A1 | 11/2005 | Cho et al. |
| 2005/0265346 A1 | 12/2005 | Ho et al. |
| 2005/0266846 A1 | 12/2005 | Kim |
| 2005/0271027 A1 | 12/2005 | Kim et al. |
| 2005/0281226 A1 | 12/2005 | Lee et al. |
| 2005/0281269 A1 | 12/2005 | Choi |
| 2006/0014542 A1 | 1/2006 | Khandekar et al. |
| 2006/0018249 A1 | 1/2006 | Shearer et al. |
| 2006/0019677 A1 | 1/2006 | Teague et al. |
| 2006/0019694 A1 | 1/2006 | Sutivong et al. |
| 2006/0034208 A1 | 2/2006 | Blouin |
| 2006/0034244 A1 | 2/2006 | Huang et al. |
| 2006/0046762 A1 | 3/2006 | Yoon et al. |
| 2006/0050637 A1 | 3/2006 | Wigard et al. |
| 2006/0062183 A1 | 3/2006 | Forte et al. |
| 2006/0084432 A1 | 4/2006 | Balasubramanian et al. |
| 2006/0098599 A1 | 5/2006 | Choi et al. |
| 2006/0099972 A1 | 5/2006 | Nair et al. |
| 2006/0129816 A1 | 6/2006 | Hinton |
| 2006/0133409 A1 | 6/2006 | Prakash et al. |
| 2006/0148493 A1 | 7/2006 | Narasimha et al. |
| 2006/0183483 A1 | 8/2006 | Hidaka |
| 2006/0187877 A1 | 8/2006 | Lundby et al. |
| 2006/0193287 A1 | 8/2006 | Ooshima et al. |
| 2006/0194581 A1 | 8/2006 | Kang et al. |
| 2006/0205413 A1 | 9/2006 | Teague |
| 2006/0223449 A1 | 10/2006 | Sampath et al. |
| 2006/0227891 A1 | 10/2006 | Niu et al. |
| 2006/0245425 A1 | 11/2006 | Mathis et al. |
| 2006/0268768 A1 | 11/2006 | Harris et al. |
| 2006/0280160 A1 | 12/2006 | Padovani et al. |
| 2006/0285485 A1 | 12/2006 | Agrawal et al. |
| 2006/0285558 A1 | 12/2006 | Dottling et al. |
| 2006/0286974 A1 | 12/2006 | Gore et al. |
| 2006/0291577 A1 | 12/2006 | Boariu |
| 2007/0003113 A1 | 1/2007 | Goldberg et al. |
| 2007/0015523 A1 | 1/2007 | Prakash et al. |
| 2007/0022441 A1 | 1/2007 | Nystrom et al. |
| 2007/0060126 A1 | 3/2007 | Taniguchi et al. |
| 2007/0064588 A1 | 3/2007 | Kisoda et al. |
| 2007/0076682 A1 | 4/2007 | Kim et al. |
| 2007/0087767 A1 | 4/2007 | Pareek et al. |
| 2007/0091817 A1 | 4/2007 | Yoon et al. |
| 2007/0097935 A1 | 5/2007 | Gorokhov et al. |
| 2007/0110000 A1 | 5/2007 | Abedi |
| 2007/0121535 A1 | 5/2007 | Chen et al. |
| 2007/0133476 A1 | 6/2007 | Li et al. |
| 2007/0147226 A1 | 6/2007 | Khandekar et al. |
| 2007/0159957 A1 | 7/2007 | Ljung et al. |
| 2007/0217387 A1 | 9/2007 | Choi et al. |
| 2008/0056183 A1 | 3/2008 | Gorokhov et al. |
| 2008/0056188 A1 | 3/2008 | Lu et al. |
| 2008/0076432 A1 | 3/2008 | Senarath et al. |
| 2008/0117842 A1 | 5/2008 | Rao |
| 2008/0123542 A1 | 5/2008 | Karlsson |
| 2008/0187064 A1 | 8/2008 | Miyoshi |
| 2008/0188214 A1 | 8/2008 | Qi |
| 2008/0259811 A1 | 10/2008 | Cordeiro et al. |
| 2008/0271138 A1 | 10/2008 | Chen et al. |

(56) References Cited

U.S. PATENT DOCUMENTS

| | | |
|---|---|---|
| 2008/0293421 A1 | 11/2008 | Ulupinar et al. |
| 2008/0310357 A1 | 12/2008 | Ulupinar et al. |
| 2008/0311908 A1 | 12/2008 | Prakash et al. |
| 2009/0034445 A1 | 2/2009 | Prakash et al. |
| 2009/0046640 A1 | 2/2009 | Prakash et al. |
| 2009/0046699 A1 | 2/2009 | Prakash |
| 2009/0067547 A1 | 3/2009 | Ulupinar et al. |
| 2009/0086758 A1 | 4/2009 | Prakash et al. |
| 2009/0097437 A1 | 4/2009 | Sutivong et al. |
| 2009/0098841 A1 | 4/2009 | Prakash et al. |
| 2009/0103507 A1 | 4/2009 | Gu et al. |
| 2009/0129325 A1 | 5/2009 | Prakash et al. |
| 2009/0135768 A1 | 5/2009 | Barriac |
| 2009/0147693 A1 | 6/2009 | Teague et al. |
| 2009/0147712 A1 | 6/2009 | Prakash et al. |
| 2009/0147713 A1 | 6/2009 | Prakash |
| 2009/0147729 A1 | 6/2009 | Ulupinar et al. |
| 2009/0147730 A1 | 6/2009 | Ulupinar et al. |
| 2009/0147739 A1 | 6/2009 | Barriac |
| 2009/0149172 A1 | 6/2009 | Prakash et al. |
| 2009/0156207 A1 | 6/2009 | Prakash |
| 2009/0161775 A1 | 6/2009 | Prakash et al. |
| 2009/0164609 A1 | 6/2009 | Prakash et al. |
| 2009/0164658 A1 | 6/2009 | Prakash |
| 2009/0175217 A1 | 7/2009 | Prakash |
| 2009/0180424 A1 | 7/2009 | Prakash et al. |
| 2009/0201833 A1 | 8/2009 | Khandekar |
| 2009/0207744 A1 | 8/2009 | Ulupinar et al. |
| 2009/0207790 A1 | 8/2009 | Ulupinar et al. |
| 2009/0207830 A1 | 8/2009 | Prakash |
| 2009/0213788 A1 | 8/2009 | Prakash et al. |
| 2009/0213789 A1 | 8/2009 | Khandekar et al. |
| 2009/0213790 A1 | 8/2009 | Barriac |
| 2009/0213791 A1 | 8/2009 | Prakash |
| 2009/0219840 A1 | 9/2009 | Barriac |
| 2009/0219845 A1 | 9/2009 | Prakash |
| 2009/0219857 A1 | 9/2009 | Barriac et al. |
| 2009/0219866 A1 | 9/2009 | Prakash et al. |
| 2009/0219867 A1 | 9/2009 | Barriac |
| 2009/0219887 A1 | 9/2009 | Barriac |
| 2009/0219917 A1 | 9/2009 | Prakash et al. |
| 2009/0220033 A1 | 9/2009 | Palanki et al. |
| 2009/0221305 A1 | 9/2009 | Ulupinar et al. |
| 2009/0222698 A1 | 9/2009 | Prakash et al. |
| 2009/0258648 A1 | 10/2009 | Willey |
| 2009/0303890 A1 | 12/2009 | Prakash |
| 2009/0305664 A1 | 12/2009 | Prakash |
| 2009/0316632 A1 | 12/2009 | Prakash |
| 2010/0002597 A1 | 1/2010 | Sampath et al. |
| 2010/0034101 A1 | 2/2010 | Ayman Naguib |
| 2010/0046423 A1 | 2/2010 | Prakash et al. |
| 2010/0110976 A1 | 5/2010 | Prakash et al. |
| 2010/0150106 A1 | 6/2010 | Barriac |
| 2010/0215030 A1 | 8/2010 | Agrawal et al. |
| 2010/0232293 A1 | 9/2010 | Sagfors et al. |
| 2011/0173464 A1 | 7/2011 | Prakash et al. |
| 2011/0199996 A1 | 8/2011 | Zhang et al. |
| 2011/0280183 A1 | 11/2011 | Sampath |
| 2013/0010755 A1 | 1/2013 | Barriac |

FOREIGN PATENT DOCUMENTS

| | | |
|---|---|---|
| CN | 1350730 A | 5/2002 |
| CN | 1496636 | 5/2004 |
| CN | 1666448 A | 9/2005 |
| EP | 0475698 A2 | 3/1992 |
| EP | 0687078 A2 | 12/1995 |
| EP | 0869647 A2 | 10/1998 |
| EP | 0955736 | 11/1999 |
| EP | 1052866 | 11/2000 |
| EP | 1124347 A2 | 8/2001 |
| EP | 1158685 A1 | 11/2001 |
| EP | 1202591 A2 | 5/2002 |
| EP | 1223775 | 7/2002 |
| EP | 1315310 | 5/2003 |
| EP | 1388964 A1 | 2/2004 |
| EP | 1458209 A2 | 9/2004 |
| EP | 1471760 | 10/2004 |
| EP | 1487230 | 12/2004 |
| EP | 1496632 A1 | 1/2005 |
| EP | 1513282 A2 | 3/2005 |
| EP | 1534039 | 5/2005 |
| EP | 1004217 | 6/2005 |
| EP | 1587233 | 10/2005 |
| EP | 1678906 | 7/2006 |
| EP | 1714416 | 10/2006 |
| EP | 1583309 B1 | 5/2007 |
| EP | 1949730 | 7/2008 |
| JP | 0722998 | 1/1995 |
| JP | 7504552 T | 5/1995 |
| JP | 7226724 A2 | 8/1995 |
| JP | 8172671 | 7/1996 |
| JP | 8242218 A | 9/1996 |
| JP | 9509547 | 9/1997 |
| JP | 10155179 A | 6/1998 |
| JP | 10242903 A | 9/1998 |
| JP | 11313370 A | 11/1999 |
| JP | 2000506343 A | 5/2000 |
| JP | 2000232688 A | 8/2000 |
| JP | 2001512638 T | 8/2001 |
| JP | 2001274767 | 10/2001 |
| JP | 2002010341 A | 1/2002 |
| JP | 2002026795 A | 1/2002 |
| JP | 2002152129 A | 5/2002 |
| JP | 2002158609 A | 5/2002 |
| JP | 2002300628 | 10/2002 |
| JP | 2002305534 A | 10/2002 |
| JP | 2002539707 | 11/2002 |
| JP | 2002540692 | 11/2002 |
| JP | 2003500891 T | 1/2003 |
| JP | 2003110582 A | 4/2003 |
| JP | 2003517741 T | 5/2003 |
| JP | 2003525555 | 8/2003 |
| JP | 2003309533 | 10/2003 |
| JP | 2004088180 A | 3/2004 |
| JP | 2004153619 A | 5/2004 |
| JP | 2004159235 | 6/2004 |
| JP | 2004517534 T | 6/2004 |
| JP | 2004247801 A | 9/2004 |
| JP | 2004247985 A | 9/2004 |
| JP | 2004530347 | 9/2004 |
| JP | 2004531124 | 10/2004 |
| JP | 2004532542 A | 10/2004 |
| JP | 2004328772 | 11/2004 |
| JP | 2005012806 A | 1/2005 |
| JP | 2005502218 T | 1/2005 |
| JP | 2005080312 A | 3/2005 |
| JP | 2005508588 | 3/2005 |
| JP | 2005101990 A | 4/2005 |
| JP | 2005514865 T | 5/2005 |
| JP | 2005160079 A | 6/2005 |
| JP | 2005233621 A | 9/2005 |
| JP | 2005286998 A | 10/2005 |
| JP | 2006523392 A | 10/2006 |
| JP | 2007501580 T | 1/2007 |
| JP | 4746096 | 5/2011 |
| KR | 20010016706 | 3/2001 |
| KR | 1020010082061 | 8/2001 |
| KR | 1020030007481 | 1/2003 |
| KR | 20040007214 | 1/2004 |
| KR | 20040050145 | 6/2004 |
| KR | 20050053787 | 6/2005 |
| KR | 20060014618 A | 2/2006 |
| RU | 2073913 C1 | 2/1997 |
| RU | 2198465 | 2/2003 |
| TW | 478269 | 3/2002 |
| TW | 531982 | 5/2003 |
| TW | 200302642 | 8/2003 |
| TW | I223532 | 11/2004 |
| TW | I223944 | 11/2004 |
| TW | 200501641 | 1/2005 |
| TW | I239782 | 9/2005 |
| TW | I240524 | 9/2005 |

(56) References Cited

FOREIGN PATENT DOCUMENTS

| | | |
|---|---|---|
| WO | WO9318601 A1 | 9/1993 |
| WO | WO9730531 A1 | 8/1997 |
| WO | WO9733399 A1 | 9/1997 |
| WO | WO9835520 | 8/1998 |
| WO | WO98039938 | 9/1998 |
| WO | WO9848581 A1 | 10/1998 |
| WO | WO9854919 A2 | 12/1998 |
| WO | WO9943101 | 8/1999 |
| WO | WO0007260 A2 | 2/2000 |
| WO | WO0010353 A1 | 2/2000 |
| WO | 0014900 | 3/2000 |
| WO | WO0013451 | 3/2000 |
| WO | WO0018173 | 3/2000 |
| WO | WO0035107 | 6/2000 |
| WO | WO0055976 A2 | 9/2000 |
| WO | WO0057662 | 9/2000 |
| WO | WO0057663 | 9/2000 |
| WO | WO0113669 A1 | 2/2001 |
| WO | 0120808 | 3/2001 |
| WO | WO0117288 A1 | 3/2001 |
| WO | WO0160104 | 8/2001 |
| WO | WO0176110 A2 | 10/2001 |
| WO | WO0176279 | 10/2001 |
| WO | 0182504 | 11/2001 |
| WO | WO0197538 | 12/2001 |
| WO | WO0228120 A2 | 4/2002 |
| WO | WO0243412 | 5/2002 |
| WO | WO0247321 | 6/2002 |
| WO | WO0249305 | 6/2002 |
| WO | WO02073867 | 9/2002 |
| WO | WO02080600 | 10/2002 |
| WO | WO02093839 | 11/2002 |
| WO | WO03015435 | 2/2003 |
| WO | WO03043251 | 5/2003 |
| WO | WO03051076 | 6/2003 |
| WO | WO03069933 | 8/2003 |
| WO | WO2004004173 | 1/2004 |
| WO | 2004032548 | 4/2004 |
| WO | WO2004032559 | 4/2004 |
| WO | WO2004038173 A2 | 5/2004 |
| WO | WO2004038988 | 5/2004 |
| WO | WO2004054206 A1 | 6/2004 |
| WO | WO2004073200 | 8/2004 |
| WO | WO2004077752 | 9/2004 |
| WO | WO2004077778 A1 | 9/2004 |
| WO | WO2004079949 A1 | 9/2004 |
| WO | WO2004082181 A1 | 9/2004 |
| WO | WO2004086711 | 10/2004 |
| WO | WO2004091231 | 10/2004 |
| WO | WO2004100450 A1 | 11/2004 |
| WO | WO2004107796 | 12/2004 |
| WO | WO2005004525 | 1/2005 |
| WO | WO2005022811 | 3/2005 |
| WO | WO2005027355 A2 | 3/2005 |
| WO | WO2005034438 | 4/2005 |
| WO | WO2005039128 | 4/2005 |
| WO | WO2005041515 | 5/2005 |
| WO | WO-2005048517 A1 | 5/2005 |
| WO | WO2005055640 A1 | 6/2005 |
| WO | WO2005060277 | 6/2005 |
| WO | WO2005064875 | 7/2005 |
| WO | WO2005067173 A1 | 7/2005 |
| WO | WO2005067181 A1 | 7/2005 |
| WO | WO2005071989 | 8/2005 |
| WO | WO2005074184 | 8/2005 |
| WO | Wo2005079081 A1 | 8/2005 |
| WO | WO2005081444 A1 | 9/2005 |
| WO | WO2005096560 A1 | 10/2005 |
| WO | 2006007318 | 1/2006 |
| WO | WO2006023705 | 3/2006 |
| WO | 2006069176 A2 | 6/2006 |
| WO | WO2006069320 | 6/2006 |
| WO | WO2006099062 A1 | 9/2006 |
| WO | 2006109492 | 10/2006 |
| WO | WO2006138556 | 12/2006 |
| WO | WO2006138573 | 12/2006 |
| WO | WO2007050876 | 5/2007 |
| WO | WO2007050939 | 5/2007 |

OTHER PUBLICATIONS

Written Opinion—PCT/US06/009549, International Search Authority—Eumpean Patent Office—Jun. 20, 2006.
International Preliminary Report on Patentability—PCT/US06/009549, The International Bureau of WIPO—Geneva,Switzerland—Sep. 18, 2007.
Taiwanese Search Report—TW095108906—Search Authority—TIPO—Feb. 1, 2009.
Damnjanovich, et al., "IS-2000 Enhanced Closed Loop Power Control for Turbo Coding", IEEE 54TH Vehicular Technology Proceedings, Oct. 7-11, 2001, pp. 2314-2318.
English Translation of the Korean Office Action mailed Aug. 31, 2010 for Korean Patent Application No. 2008-7012604, 3 pages.
English Translation of the Chinese Office Action dated Aug. 31, 2010 for Chinese Patent Application No. 2006-80049431.0, 2 pages.
EP Office Action for European Patent Application 06836548,5 dated Mar. 3, 2010; pp. 4.
European OA dated May 14, 2009 for US Application Serial No. 06 826 883.8-1237 , 4 pages.
European OA dated May 14, 2009 for EP Application Serial No. 06 827 064A-1237, 4 pages.
European Office Action Dated Aug. 21, 2008 for European Application Serial No. 068271782, 3 Pages.
Korean OA Dated Nov. 25, 2009 for KR Application Serial No. 20087012719, 4 Pages.
Korean Office Action Dated Apr. 30, 2010 for Korean Application Serial No. 2008-7012462, 3 Pages.
Korean Office Action Dated Mar. 19, 2010, for Korean Patent Application Serial No. 2008-7012456, 4 Pages.
Korean Office Action Dated Mar. 30, 2010 for Korean Patent, Application Serial No. 2008/7012610, 3 Pages.
Korean Office Action for Korean Patent Application 2008-7012453 dated Jan. 27, 2010; pp. 3.
Korowajczuk L., et al, "Designing cdma2000 Systems", John Wiley & Sons, Inc., 2004, 34 pages.
OA dated Dec. 29, 2008 for European Application Serial No. 06826840.8, 3 pages.
OA mailed Feb. 26, 2010 for Korean Patent Application Serial No. 2008-7012649, 3 pages.
OA mailed Aug. 31, 2010 for Korean Patent Application Serial No. 2008-7012649, 3 pages.
Office Action mailed Mar. 15, 2010 for Korean Patent Application No. 20087012580, 3 pages.
Office Action mailed Jul. 29, 2010 for Korean Patent Application No. 20087012580, 3 pages.
Office Action mailed Jan. 26, 2010 for Korean Patent Application No. 2008-7012457, 3 pages.
Office Action mailed Feb. 26, 2010 for Korean Patent Application No. 2008-7012604,4 Pages.
Office Action mailed Aug. 2, 2010 for European Patent Application No. 06827064, 8 Pages.
Tomcik, Jim, "MBFDD and MBTDD Wideband Mode: Technology Overview," IEEE 802.20, Working Group or Mobile Broadband Wireless Access, Jan. 6, 2006, pp. 1-79.
U.S. Appl. No. 60/731,037, filed Oct. 27, 2005, entitled "Methods and Apparatus for Providing Mobile Broadband Wireless Higher MAC", 148 pages.
3GPP, ETSI: Universal Mobile Telecommunications system (UMTS); Radio Resource Control (RRC); Protocol specification (3GPP TS 25.331 version 7.2.0 Release 7), ETSI TS 125 331 V.7.2.0, Sep. 2006, XP002423759.
3GPP2 "cdma2000 High Rate Packet Data Air interface Specification", 3rd Generation Partnership Project 2 C.S0024, Sep. 12, 2000, pp. 1-417.
3GPP2 C: "cdma2000 High Rate Packet Data Air Interface Specification; 3GPP2 C.S0024-A version 2.0," 3GPP2 CDMA2000, Jul.

(56) References Cited

OTHER PUBLICATIONS 2005, p. 0, 8-13-8-15, 8-101, XP002426056, p. 8-13, line 17-line 35; p. 8-14, line 15-line 32; p. 8-15, line 4-line 12; p. 8-101, line 30-line 32.
3GPP2. "cdma2000 High Rate Packet Data Air Interface Specification", Chapter 9—"Connection Layer", C.S0024-A, Version 1.0, Mar. 2004, 144 pages, XP002424014.
3GPP2, "cdma2000 High Rate Packet Data Air Inerface Specification", C. S0024-A Version 2.0, Oct. 27, 2000, 441 pages.
3GPP2 C.S0024-0-Version 4.0 "cdma2000 High Rate Packet Data Air Interface Specification", p. 1-548, Oct. 25, 2002.
3GPP2 C.S0024-A, Version 2.0—3rd Generation Partnership Project 2; "CDMA2000 High Rate Packet Data Air Interface Specification"; Jul. 2005, 1227 pages; XP002431799.
3rd Generation Partnership Project 2 "3GPP2": Medium Access Control (MAC) Standard for cdma2000 Spread Spectrum Systems, Release D; 3GPP2 CS0003-D Version 2.0, Sep. 2005 (pp. 1-230) XP002429116.
3rd Generation Partnership Project 2 "3GPP2": "Signaling Link Access Control (LAC) Standard for cdma2000 Spread Spectrum Systems Revision D v2.0" 3GPP2 C.SO004-D Version 2.0, Sep. 2005, XP002427509, pp. 1-12, pp. 2-46-pp. 2-51.
802.20 Evaluation Criteria—Ver. 1.0, IEEE 802 LANIMAN Standards Committee, Sep. 23, 2005, pp. 18-35, URL: [http://www.ieee802.org/20/P_Docs/IEEE_802.20-PD-09.doc].
Agilent Technologies: Performance Base Station Over—Air Maintenance with the Agilent E6474A CDMA, Mar. 2002, XP002423351, retrieved from the internet on Mar. 6, 2007, pp. 16-17, 23. http://cp.literature.agilent.com/litweb/pdf/E6474-90042.pdf. Last accessed May 23, 2008, 33 pages.
cdma2000 High Rate Packet Data Air Interface Specification, 3GPP2 C.S0024-A Version 2.0, Jul. 2005, p. 8-97-8-114, URL, http://www.3gpp2.org/Public_html/specs/C.S0024-Av2.0_050727.pdf.
Chinese OA dated Nov. 30, 2010 for CN Applcation Serial No. 200680049404.3, 8 pages.
Chinese OA dated Jan. 19, 2011 for Chinese Application U.S. Appl. No. 200680049699.4, 11 pages.
Chinese Office Action dated Nov. 12, 2010 for Chinese Patent Application Serial No. 200680049463.0, 7 pages.
Chinese Office Action dated Nov. 9, 2010, mailed Jan. 12, 2011, for Chinese Patent Application Serial No. 200680049589.8, 8 pages.
Chinese Office Action dated Dec. 31, 2010, for Chinese Patent Application Serial No. 200680049364.2, 5 pages.
Chinese Office Action dated Dec. 24 2010 for Chinese Patent Application No. 200680049284.7, 5 pages.
Chinese Office Action dated Dec. 27, 2010 for Chinese Patent Application Serial No. 200680049300.2, 2 pages.
Chinese Office Action dated Dec. 31, 2010 for Chinese Patent Application Serial No. 200680049680.X, 9 pages.
Chinese Office Action date Jan. 6, 2011 for Chinese Application Serial No. 200680049670.6, 4 pages.
Chinese Office Action dated Oct. 13, 2010, mailed Dec. 7, 2010, for Chinese Patent Application Serial No. 200680049771.3, 11 pages.
Chinese Office Action dated Sep. 6, 2010, for Chinese Patent Application Serial No. 200680049310.6, 5 pages.
Chinese Office Action for Chinese Application No. 200680049812.9 dated Jan. 25, 2011. 11 pages.
Chinese Office Action for CN Application No. 200680049744.6 dated Sep. 9, 2010, 4 pages, Sep. 2010.
Chinese Office action mailed Sep. 8, 2010 for Chinese patent application No. 200680049451.8, 2 pages.
CN OA dated Dec. 31, 2010 for CN Application Serial No. 200680049332.2, 27 pages.
CN OA for Chinese Application No. 200680049630.1 dated Dec. 31, 2010, 7 pages.
CN Office Action mailed Jan. 6, 2011 for Chinese Patent Application No. 200680049640.5, 5 pages.
EP OA dated Oct. 4, 2010 for European Application Serial No. 06827070.1, 4 pages.
EP OA dated Feb. 19, 2009 for EP Application Serial No. 06836638.4-24112 11 pages.
EP OA dated Feb. 20, 2009 for EP Application Serial No. 06 827 070.1-2412, 5 pages.
EP OA dated Mar. 17, 2009 for European Application No. 06 826 886.1-2412, 10 pages.
EP OA dated Mar. 17, 2009 for European Application No. 06 827 080.0-2412, 6 pages.
EP OA dated Oct. 4. 2010 for EP Application Serial No. 06836638.4, 4 pages.
EP OA for EP Application No. 06826942.2 dated Jan. 25, 2011, 3 pages.
ETS 300744, Digital Video Broadcasting; Framing Structure, Channel Coding, and Modulation for digital Terrestrial Television, European Telecommunication Standards Institute (ETSI), Nov. 1996.
European OA dated Oct. 5, 2010 for European Application Serial No. 06836689.7-2412, 4 pages.
European OA dated Feb. 19, 2009 for European Application Serial No. 06 836 689.7-2412, 6 pages.
European OA dated Feb. 20, 2009 for European Application Serial No. 06 826 915.8-2412, 5 pages.
European OA dated Sep. 9, 2008 for EP Application Serial No. 06 826 733.5-2412, 2 pages.
European Office Action dated Sep. 24, 2010, for European Patent Application Serial No. 06826919.0, 4 pages.
European Office Action dated Sep. 24, 2010, for European Patent Application Serial No. 06836656.6, 4 pages.
European Office Action dated Dec. 14, 2009, for European Patent Application Serial No. 06826816.8, 2 pages.
European Office Action dated Dec. 18, 2009, for European Patent Application Serial No. 06826807.7, 4 pages.
European Office Action dated Jun. 10, 2010 for European Patent Application Serial No. 06827080.0, 5 pages.
European Office Action dated Oct. 4, 2010, for European Patent Application Serial No. 06826853.1, 7 pages.
European Office Action dated Sep. 17, 2008, for European Patent Application Serial No. 06826807.7, 6 pages.
European Office Action dated Sep. 24, 2010, for EP Patent Application Serial No. 06826849.9, 4 pages.
European Office Action for European Application No. 06827130.3-2412 dated Sep. 24, 2010, 4 pages.
European Office Action mailed Sep. 24, 2010 for European Patent Application No. 06844225.0, 4 pages.
European Patent Office Action dated Apr. 12, 2010 for EP Application Serial No. 06817409.3, 4 pages.
IEEE 802.20 Working Group on Mobile Broadband Wireless Access; QFDD and QTDD: Proposed Draft Air Interface Specification; IEEE C802.20-05/69, Oct. 28, 2005, retrieved from the internet on Mar. 5, 2007, pp. 6-43-6-44, XP002425098, http://ieee802.org/20/Contributions.htmi. Last accessed May 24, 2008, 624 pages.
IEEE: "Draft IEEE Standard for Local and metropolitan area networks, Part 16: Air Interface for Fixed Broadband WirelessAccess-Systems, chapters:6.3.2.3,6.3.15-6.3.17,8.2.1.4-8.2.1.11,8.3.5-8.4.5,8.4.11,11". IEEEP802.16-REVDID5, May 2004, XP002423445.
Japanese OA dated Dec. 21, 2010 for JP Application Serial No. 2008538094, 6 pages.
Japanese OA dated Dec. 7, 2010 for Japanese Application Serial No. 2008-538097, 3 pages.
Japanese Office Action dated Dec. 7, 2010 for Japanese Patent Application Serial No. 2008-538002, 3 pages.
Japanese Office Action dated Jan. 26, 2011, mailed Feb. 1, 2011, for Japanese Patent Application Serial No. 2008-537997, 2 pages.
Japanese Office Action dated Jan. 4, 2011 for Japanese Patent Application Serial No. 2008-537944, 4 pages.
Japanese Office Action for Japanese Application No. 2008-538096 dated Feb. 8, 2011, 6 pages.
Japanese Office Action mailed Dec. 7, 2010 for Japanese Patent Application Serial No. 2008-537990, 3 pages.
Japanese Office Action mailed Dec. 21, 2010, for Japanese Patent Application Serial No. 2008-537985, 3 pages.
Jeon et al., An enhanced channel quality indication (CQI) reporting scheme for HSDPA systems, IEEE Communication letters. May 2005, vol. 9, pp. 432-434.

(56) References Cited

OTHER PUBLICATIONS

Jim Tomcik, "C802.20-05/69: QFDO and QTDD: Proposed Draft Air Interface Specification". Contributions to IEEE 802.20 Session 17: Nov. 14-17, 2005; Oct. 28, 2010, pp. 1-624; XP002423945, http://ieee802.org/20/Contributions.html.
Jim Tomcik, et al., MBFDD and MBTDD: Proposed Draft Air Interface Specification. IEEE 802.20 Working Group on Mobile Broadband Wireless Access, Jan. 6, 2006: pp. 1-839; XP002426594. http://www.ieee802.org/20/Contribs/C802.20-06-04.pdf.
Jim Tomcik "MBFDD and MBTDD Wideband Mode: Technology Overview" Jan. 6, 2006 (109 pages) XP002422172 Retrieved from the Internet: URL: http://www.ieee802.org/20/contributions.html >.
JP Office Action for JP application No. 2008-537956 mailed Dec. 7, 2010, 3 pages.
JP Office Action mailed Jan. 1, 2011 for Japanese Patent Application No. 2008-538069, 3 pages.
Korean OA dated Jan. 26, 2010 for KR Application Serial No. 2008-7012552, 2 pages.
Korean OA dated Dec. 9, 2009 for Korean Application Serial No. 2008-7012459, 3 pages.
Korean OA dated May 26, 2010 for Korean Application Serial No. 2008-7012459, 3 pages.
Korean Office Action dated Feb. 26, 2010 for Korean Application No. 2008-7012769, 3 pages.
Korean Office Action dated Apr. 28, 2010 for Korean Patent Application Serial No. 2008-07012762, 4 pages.
Korean Office Action dated Aug. 27, 2010 for Korean Patent Application Serial No. 2008-7012463, 3 pages.
Korean Office Action dated Aug. 27, 2010, for Korean Patent Application Serial No. 2008-7012474, 3 pages.
Korean Office Action dated Aug. 31, 2010 for Korean Patent Application Serial No. 2008-7012754, 3 pages.
Korean Office Action dated Aug. 31, 2010, for KR Patent Application Serial No. 2008-7012554, 3 pages.
Korean Office Action dated Dec. 24, 2009, for Korean Patent Application Serial No. 2008-7012465, 2 pages.
Korean Office Action dated Dec. 29, 2010 for Korean Patent Application Serial No. 2008-7012471, 3 pages.
Korean Office Action dated Dec. 9, 2009 for Korean Patent Application Serial No. 2008-7012471, 3 pages.
Korean Office Action dated Feb. 25, 2010 for Korean Patent Application Serial No. 2008-7012476, 4 pages.
Korean Office Action dated Feb. 25, 2010 for Korean Patent Application Serial No. 2008-7012754, 4 pages.
Korean Office Action dated Feb. 26, 2010, for KR Patent Application Serial No. 2008-7012554, 3 pages.
Korean Office Action dated Jan. 28, 2010 for Korean Patent Application Serial No. 2008-7012463, 4 pages.
Korean Office Action dated Jan. 28, 2010, for Korean Patent Application Serial No. 2008-7012474, 4 pages.
Korean Office Action dated Jan. 29, 2010 for Korean Patent Application Serial No. 2008-7012558, 3 pages.
Korean Office Action dated Jun. 28, 2010 for Korean Patent Application Serial No. 2008-7012471, 3 pages.
Korean Office Action dated Mar. 30, 2010 for Korean Appiication No. 2008-7012586, 3 pages.
Korean Office Action dated Sep. 30, 2010 for Korean Application Serial No. 2010-7017046, 4 pages.
Korean Office Action for Korean Application No. 2008-7012687 dated Mar. 31, 2010, 4 pages.
Korean Office Action for Korean Application No. 2008-7012687 dated Sep. 30, 2010, 4 pages.
Korean Office Action for KR Application Serial No. 2008-7012764 dated Mar. 19, 2010, 4 pages.
Korean Office Action for KR Application Serial No. 2008-7012764 dated Aug. 27, 2010, 3 pages.
Korean Office Action from Korean Patent Application No. 2008-7012724 dated Apr. 27, 2010, pp. 3.
KR OA dated Aug. 25, 2010 for Korean Application Serial No. 2008-7012480, 2 pages.
KR OA dated Jan. 29, 2010 for KR Application Serial No. 2008-7012603, 5 pages.
KR OA dated Jun. 28, 2010 for KR Application Serial No. 2008-7012603, 5 pages.
Liu Dawei, et al. "A New Access Method Used in Beyond 3G Mobile System Using MC-CDMA" in International Conference on Communications, Circuits and Systems and West Sino Expositions, IEEE, 2002. Jun. 29-Jul. 1, 2002, Piscataway, NJ, USA, vol. 1, pp. 170-171, XP010632240, ISBN: 0-7803-7547-5. http://ieeexplore.ieee.org/ie15/8402/26511/01180596.pdf?tp=&arnumber=1180596&isnumber=26511. Last accessed May 23, 2008, 2 pages.
Lucent Technologies: "MIMO system integration and signalling in HSDPA" 3GPP TSG RAN WG1, R1-01-0305, [Online] Feb. 27, 2001, XP002428085 Las Vegas, USA Retrieved from the Internet: URL:www.3gpp.org.
Notice of Grounds for Rejection for Korean Application No. 2008-7012768, dated Oct. 29, 2010 (English Translation).
OA dated Feb. 20, 2009 for European Application Serial No. 06 836 598.0-2414, 10 pages.
OA dated Jul. 1, 2009 for Korean Application Serial No. 2008-7012465, 9 pages.
Office Action for Chinese Application No. 200680049394.3 dated Jan. 10, 2011, 8 pages.
Office Action for Chinese Application Serial No. 200680049342.6 dated Jun. 11, 2010, 5 pages.
Office Action for Korean Application No. 2008-7012761 dated Jan. 25, 2011, 4 pages.
Office Action for Korean Application No. 2008-7012761 dated May 19, 2010, 4 pages.
Office Action for Korean Application Serial No. 2008-7012756 dated Jul. 29, 2010, 2 pages.
Office Action for Korean Patent Application No. 2008-7012556 dated Apr. 30, 2010, 2 pages.
Office Action for Korean Patent Application Serial No. 2008-7012768 dated Apr. 28, 2010, 4 pages.
Office Action mailed Jan. 25, 2010 for Korean Patent Application No. 2008-7012767 3 pages.
Office Action mailed Jan. 25, 2011 for Japanese Patent Application No. 2008-538077, 3 pages.
Office Action mailed Jan. 26, 2010 for Korean Patent Application No. 2008-7012467, 5 pages.
Office Action mailed Jan. 26, 2010 for Korean Patent Application No. 2008-7012579, 4 pages.
Office Action mailed Jan. 29, 2010 for Korean Patent Application Serial No. 2008-7012464, 5 pages.
Office Action mailed Oct. 30, 2009 for Korean Patent Application No. 2008-7012766, 3 pages.
Office Action mailed Nov. 16, 2009 for Korean Patent Application No. 2008-7012767 3 pages.
Office Action mailed Dec. 14, 2010 for Chinese Patent Application No. 200680049322.9, 5 pages.
Office Action mailed Dec. 18, 2009 for European Patent Application Serial No. 06836601.2, 3 pages.
Office Action mailed Feb. 23, 2010 for Korean Patent Application No. 2008-7012570, 4 pages.
Office Action mailed Feb. 26, 2010 for Korean Patent Application No. 2008-7012460, 4 pages.
Office Action mailed Feb. 26, 2010 for Korean Patent Application No. 2008-7012461, 3 pages.
Office Action mailed Feb. 26, 2010 for Korean Patent Application No. 2008-7012480, 3 pages.
Office Action mailed Mar. 10, 2010 for Korean Patent Application No. 2008-7012468, 3 pages.
Office Action mailed Mar. 23, 2010 for Korean Patent Application No. 2008-7012481, 3 pages.
Office Action mailed Apr. 23, 2010 for Korean Patent Application No. 2008-7012767 2 pages.
Office Action mailed Jun. 29, 2010 for Korean Patent Application No. 2008-7012461, 3 pages.
Office Action mailed Aug. 13, 2009 for Korean Patent Application Serial No. 2008-7012757, 3 pages.
Office Action mailed Aug. 27, 2008 for European Patent Application Serial No. 06836601.2, 7 pages.

(56) References Cited

OTHER PUBLICATIONS

Office Action mailed Sep. 27, 2010 for Chinese Patent Application No. 200680049453.7, 13 pages.
Office Action mailed Sep. 30, 2010 for Korean Patent Application No. 2008-7012481, 4 pages.
QUALCOMM Europe, Description and link simulations of MIMO schemes for OFDMA based E-UTRA downlink evaluation, 3GPP TSG-RAN WGI #42 R1-050903, Sep. 2, 2005, URL: http://www.3gpp.org/ftp/tsg_ran/WGI_RLI/TSGRI-42/Docs/R1-050903.zip.
QUALCOMM: "UHDR-One Connection Layer: Registration, Paging and Disc. Features" 3GPP2, [Online] Aug. 25, 2006, pp. 1-17, XP002429007.
Rosenberg, J. et al.: "SIP: Session Initiation Protocol; RFC 3261" Request for Comments: 3261, Jun. 2002, p. 1, 176, 177, 184-193, XP002423186.
Sandip Sarkar: "Qualcomm Proposal for 3GPP2 Physical Layer; Version 1.0; pp. 1-10, 72-74; C30-20060522-035 QC-Proposal-v1.0" QUALCOMM; 3GPP2, [Online] May 22, 2006, XP002426839.
Taiwan Search Report—TW095121792—TIPO—Jan. 21, 2011.
Telecommunications Industry Association: Upper Layer (Layer 3) Signaling Standard for CDMA2000 Spread Spectrum Systems, Release C, (186 pages) chapters: 2.6.4.3,2.6,6.2.8,2.73..26..63,. TIA/EIA Interim Standard; TIA/EIA/IS-2000. 5-C, May 2002 XP002423446.
Translation of Chinese Office Action for Chinese Application Serial No. 200680049342.6 dated Jan. 12, 2011, 6 pages.
Translation of Japanese Office Action for JP Application No. 2008-538003, dated Dec. 7, 2010.
Translation of Office Action in Chinese application 200680049482.3 corresponding to U.S. Appl. No. 12/091,447, citing CN1496636 dated Mar. 17, 2011.
Translation of Office Action in Japan application 2008-517175 corresponding to U.S. Appl. No. 11/454,474, citing JP2004159235, JP0722998 and WO2004107796 dated Feb. 1, 2011.
Translation of Office Action in Japan application 2008-537976 corresponding to U.S. Appl. No. 12/091,461, citing 3GPP2_C_SO024P8_154_8_165_10_45_year_2005.
3GPP2_C_SO024_P8_151_8_170_year_2005, JP2005508588, JP2004153619, JP2004530347, JP2001274767, JP2004088180 and JP2005514865 dated Mar. 3, 2010.
Translation of Office Action in Japan application 2008-538031 corresponding to U.S. Appl. No. 12/091,576, citing JP2002026795, JP2003517741, JP2003110582 and WO0247321 dated Feb. 22, 2011.
Translation of Office Action in Japan application 2008-538107 corresponding to U.S. Appl. No. 12/091,475, citing WO2005074184 and JP2005101990 dated Feb. 24, 2011.
Translation of Office Action in Japanese application 2008-537974 corresponding to U.S. Appl. No. 12/091,480, citing EP1487230, JP2005286998, JP2001512638, JP2005502218 and WO0249305 dated Feb. 24, 2011.
Translation of Office Action in Japanese application 2008-538098 corresponding to U.S. Appl. 12/091,455, citing 3GPP2_C_S0024_A_XP002430079_pgs_8_155_8_169_year_2005, JP11313370, JP2002010341 and JP2002305534 dated Mar. 3, 2011.
Turner, S. et al., "cdma 2000 Hybrid Access Terminal Operation", Announcement Qualcomm CDMA Technologies, San Diego, CA, USA, Apr. 9, 2001, pp. 1-25, XP0022422171.
Wonil Roh et. al.: "An Effect CQICH Signaling for MIMO OFDMA" IEEE 802.16 Broadband Wireless Access Working Group, [Online ]Aug. 31, 2004, XP002428096 Retrieved from the Internet: URL: www.ieee802.org/16/>.
3GPP2 C.S0024-A V2.0, Jul. 2005, p. 8-11-8-12, 8-29-8-31, (for information: p. 8-86-8-87, 8-101).
3GPP2 C.S0024-A V2.0, Jul. 2005, pp. 8-10 to 8-12, 8-29 to 8-32, 8-86 to 8-87, 8-106, and 8-168.
3GPP2. Medium Access Control (MAC) Standard for cdma2000 Spread Spectrum Systems, 3GPP2 C.S0003-D Version 1.0, p. '2-87'-2.92, Feb. 13, 2004, published online at [http://www.3gpp2.org/Public_html/specs/C.S0003-D.v1.0_MAC_031504.pdf] 8 pages.

cdma2000 High Rate Packet Data Air Interface Specification, 3GPP2 C.S0024-A, Jul. 2005, Version 2.0, p. 8-151, 8-157-8-169, section 8.9.1 and 8.9.6.2.1, URL, http://www.3gpp2.org/Public_html/specs/C.S0024-A_v2.0_050727.pdf.
Chinese OA for CN Application No. 200680049464.5, mailed Jan. 10, 2011, 5 pages.
Chinese Office Action dated Apr. 27, 2011 for Chinese Patent Application Serial No. 200680049463.0, 7 pages.
Chinese Office Action dated Apr. 20, 2011 for CN Application No. 200680049600.0; 11 pages.
Chinese Office Action dated Apr. 26, 2011, for Chinese Patent Application Serial No. 200680049310.6, 6 pages.
Chinese Office Action dated Feb. 18, 2011, for Chinese Patent Application Serial No. 200680049274.3, 6 pages.
Chinese Office Action dated Feb. 18, 2011 for CN Patent Application Serial No. 200680049802.5, 7 pages.
Chinese Office Action dated Jan. 20, 2011 for Chinese Patent Application No. 200680049251.2.
Chinese Office Action dated Jan. 26, 2011 for Chinese Patent Application Serial No. 200680049492.7, 5 pages.
Chinese Office Action dated Mar. 2, 2011 for CN Application Serial No. 200680049453.7, 4 pages.
Chinese Office Action for Chinese Application Serial No. 200680049342.6 dated Apr. 27, 2011, 6 pages.
Chinese Office Action for CN Application Serial No. 200680049677.8 dated Jan. 26, 2011, 7 pages.
Chinese Office Action translation for Chinese Patent Application No. 200680049836.4, dated May 17, 2011, 9 pages.
CN Office Action for Chinese Application No. 200680049752.0 mailed Mar. 23, 2011, pp. 4.
CN Office Action mailed Feb. 24, 2011 for Chinese Patent Application Serial No. 200680049352.X, 9 pages.
CN Office Action with English translation for CN application No. 200680049443.3 mailed Jan. 26, 2011, pp. 6.
CN Office Action with English translation for CN application No. 200680049740.8 mailed Mar. 16, 2011, pp. 5.
English Translation of Japanese Office Action mailed Feb. 22, 2011 for Japanese Patent Application No. 2008-537965.
European Office Action dated Dec. 19, 2008 for European Application No. 06 817409.3.
European Office Action dated Feb. 8, 2011 for EP Application Serial No. 06827064.4, 14 pages.
European Search Report dated Jun. 16. 2011 for EP Application Serial No. 11167329.9, 6 pages.
Harada et al., "Investigations on BLER requirements of associated control channels for IP packet transmission in forward link for VSF-OFCDM broadband packet wireless access", Vehicular Technology Conference, 2004. VTC2004-Fall. 2004 IEEE 60th, Sep. 2004.
Japanese OA dated Feb. 22, 2011 for JP Application Serial No. 2008-537946, 4 pages.
Japanese OA dated May 10, 2011 for JP Application Serial No. 2008-538094, 3 pages.
Japanese Office Action dated Mar. 1, 2011, for Japanese Patent Application Serial No. 2008-538025, 4 pages.
Japanese Office Action dated Feb. 15, 2011 for Japanese Patent Application No. 2008-537969.
Japanese Office Action dated Feb. 8, 2011, for Japanese Patent Application Serial No. 2008-537988, 5 pages.
Japanese Office Action dated Jan. 18, 2011 for JP Application No. 2008-537970; 5 pages.
Japanese Office Action dated Jan. 25,2011 for Japanese Patent Application No. 2008537979, 5 pages.
Japanese Office Action dated Mar. 1, 2011, for Japanese Patent Application Serial No. 2008-537964, 5 pages.
Japanese Office Action dated Mar. 15, 2011 for Japanese Application Serial No. 2008-538106, 5 pages.
Japanese Office Action dated Mar. 15, 2011 for JP Patent Application Serial No. 2008-538022, 5 pages.
Japanese Office Action for Japanese Application Serial No. 2008-537996 dated Mar. 29, 2011, 6 pages.
Japanese Office Action mailed Mar. 1, 2011, for JP Patent Application Serial No. 2008-538079, 6 pages.

(56) References Cited

OTHER PUBLICATIONS

JP OA dated Mar. 1, 2011 for JP Application Serial No. 2008-538068, 4 pages
JP OA for Japanese Application No. 2008-538033 dated Feb. 22, 2011, 2 pages.
JP Office Action for Japanese Application No. 2008-537980 dated Mar. 29, 2011, 4 pages.
JP Office Action from Japanese Patent Application No. 2008-538084 dated Mar. 29, 2011, pp. 6.
JP Office Action mailed Feb. 22, 2011 for Japanse Patent Application Serial No. 2008-537994, 5 pages.
JP Office Action with English translation for JP Application No. 2008-538014 mailed Mar. 15, 2011, pp. 11.
Korean Office Action dated Feb. 17, 2011 for Korean Patent Application Serial No. 2010-7029654, 3 pages.
Office Action dated Jan. 25, 2011 for European Patent Application No. 06826876.2, 3 pages.
Office Action dated Oct. 9, 2010 for Chinese Patent Application No. 200680049399.6, 11 pages.
Office Action dated Mar. 1, 2011 for Japanese Patent Application No. 2008-537995, 4 pages.
Office Action for Chinese Patent Application No. 200680049746.5 dated Jan. 26, 2011.
Office Action mailed Mar. 9, 2010 for U.S. Appl. No. 12/091,482, 29 pages.
Office Action mailed May 6, 2011 for Chinese Patent Application No. 200680049640.5, 5 pages.
Office Action mailed Sep. 13, 2010 for U.S. Appl. No. 12/091,482, 20 pages.
Preliminary Notice of Reasons for Rejection for Japanese Application No. 2008-537984, dated Mar. 15, 2011 (English Translation).
Qualcomm Europe, Qualitative Evaluation of MIMO schemes for OFDM-based E-UTRA downlink, 3GPP TSG-RAN WG1 #42bis R1-051267, Oct. 14, 2005, URL, http://www.3gpp.org/ftp/tsg_ran/WG1_RL1/TSGR1_42bis/Docs/R1-051267.zip, 5 pages.
Soong et al., "Forward High-Speed Wireless Packet Data Service in 15-2000 1xEV-DV" IEEE Communications Magazine, 41 (8), pp. 170-177, Aug. 2003.
Telecommunications Industry Association. "Upper Layer (Layer3) Signaling Standard for cdma2000 Spread Spectrum Systems," TIA/EIA/IS-2000.5-A-1, Nov. 2000, published online at [http://www.tiaonline.org/standards/technology/cdma2000/documents/TIA-EIA-IS-2000-5-A-1.pdf] 11 pages.
TIA-EIA-IS-856, TIA/EIA Interim Standard, "cdma2000 High Rate Packet Data Air Interface Specification," Telecommunications Industry Association, Nov. 2000.
Translation of Japanese Office Action for Japanese Application Serial No. 2008-538024 dated Feb. 1, 2011.
Translation of Office Action for Chinese Patent Application No. 200680049832.6 dated Jan. 12, 2011.
Translation of Office Action for Japanese Patent Application No. 2008-538080 dated Mar. 29, 2011.
Translation of Office Action for Japanese Patent Application No. 2008-538081 dated Feb. 8, 2011.
3GPP2 C: "cdma2000 High Rate Packet Data Air Interface Specification", 3GPP2 C. S0024-A version 2.0, 3GPP2 CDMA2000, May 2006, 1621 pages.
Chinese OA dated Jul. 29, 2011 for Chinese Application Serial No. 200680049699.4, 12 pages.
Chinese Office Action dated May 31, 2011 for Chinese Patent Application No. 200680049838.3, 4 pages.
Chinese Office Action dated Aug. 2, 2011, for Chinese Patent Application Serial No. 200680049364.2, 5 pages.
Chinese Office Action dated Sep. 6, 2011, for Chinese Patent Application Serial No. 200680049464.5, 7 pages.
Chinese Office Action dated Aug. 18, 2011 for CN Patent Application Serial No. 200680049802.5, 7 pages.
Chinese Office Action dated Aug. 23, 2011 for Chinese Patent Application No. 200680049251.2, 6 pages.
Chinese Office Action dated Aug. 3, 2011 for Chinese Patent Application Serial No. 200680049492.7, 7 pages.
Chinese Office Action dated Aug. 31, 2011, for Chinese Patent Application Serial No. 200680049274.3, 7 pages.
Chinese Office Action dated Jun. 27, 2011 for Chinese Patent Application Serial No. 200680049300.2, 4 pages.
Chinese Office Action dated Jun. 29, 2011 for CN Application Serial No. 200680049453.7, 4 pages.
Chinese Office Action for CN Application Serial No. 200680049677.8 dated Jul. 13, 2011, 9 pages.
Chinese office Action mailed Jun. 22, 2011, for Chinese Patent Application Serial No. 200680049400.5, 4 pages.
CN OA dated Jul. 22, 2011 for CN Application Serial No. 200680049332.2, 13 pages.
CN OA for Chinese Application No. 200680049630.1 dated Aug. 5, 2011, 4 pages.
CN Office Action dated Aug. 3, 2011 for CN Patent Application Serial No. 200680049352.X, 10 pages.
English Translation of Japanese Office Action for Japanese Patent Application No. 2008-537984, dated Sep. 13, 2011, 7 pages.
EP OA for EP Application No. 06826942.2 dated Jun. 14, 2011, 5 pages.
European Office Action dated Aug. 11, 2011 for European Patent Application Serial No. 06826727.7, 6 pages.
European Office Action dated Aug. 11, 2011 for EP Application No. 06817411.9; 7 pages.
European Office Action for European Patent Application No. 06 817 413.5-2412, dated Aug. 11, 2011, 7 pages.
European Office Action from European Application No. 06 827 128.7-2412 dated Aug. 11, 2011.
Japanese OA mailed May 31, 2011 for Japanese Application Serial No. 2008-538097, 2 pages.
Japanese Office Action dated Aug. 16, 2011 for Japanese Patent Application No. 2008-537969, 1 page.
Japanese Office Action dated Feb. 8, 2011 for Japanese Patent Application Serial No. 2008538082, 3 pages.
Japanese Office Action dated Jul. 26, 2011 for Japanese Application Serial No. 2008-538106, 4 pages.
Japanese Office Action dated Jun. 21, 2011 for JP Application No. 2008-537970; 3 pages.
Japanese Office Action dated Sep. 6, 2011 for Japanese Patent Application Serial No. 2008538082, 7 pages.
Japanese Office Action from JP Patent Application No. 2008-538084, dated Aug. 23, 2011. 2 pages.
Jim Tomcik "MBFDD and MBTDD Wideband Mode: Technology Overview" Oct. 28, 2005 XP002422172 Retrieved from the Internet: URL: http://www.ieee802.org/20/contributions.html >.
JP OA mailed Aug. 23, 2011, for JP Application Serial No. 2008538068, 6 pages.
JP Office Action dated Aug. 2, 2011, for Japanese Patent Application No. 2008-538069, 2 pages.
Korean Office Action dated Jul. 29, 2011 for Korean Patent Application Serial No. 2010-7024469, 3 pages.
Office Action dated Mar. 29, 2011 for Japanese Patent Application No. 2008-537978, 9 pages.
Tomcik, Jim, "MBFDD and MBTDD Wideband Mode: Technology Overview," IEEE 802.20, Working Group or Mobile Broadband Wireless Access, January 6, 2006, pp. 1-79, XP002425666.
Translation of Office Action for Chinese Patent Application No. 200680049832.6 dated Jul. 19, 2011, 4 pages.
3GPP2 C: "cdma2000 High Rate Packet Data Air Interface Specification; 3GPP2 C S0024-A version 2.0," 3GPP2 CDMA2000, Jul. 2005, 43 pages.
Chinese Office Action dated Jan. 11, 2011, for Chinese Patent Application Serial No. 200680049428.9, 4 pages.
Chinese Office Action dated Jul. 14, 2010, mailed Sep. 27, 2010 for Chinese Patent Application Serial No. 200680049428.9, 4 pages.
Chinese Office Action dated May 11, 2011, for Chinese Patent Application Serial No. 200680049428.9, 6 pages.
European Office Action dated Sep. 24, 2010 for European Patent Application Serial No. 06826918.2, 4 pages.
Japanese Office Action dated Aug. 30, 2011 for Japanese Patent Application Serial No. 2008-538023, 3 pages.

(56) References Cited

OTHER PUBLICATIONS

Japanese Office Action dated Mar. 1, 2011 for Japanese Patent Application Serial No. 2008-538023, 3 pages.
Jim Tomcik, "C80220-05169: QFDD and QTDD: Proposed Draft Air Interface Specification" IEEE: Contributions to IEEE 80220 session 17: Nov. 14-17, 2005 dated Oct. 28, 2005 XP002422600 http://ieee802org/20/Contributions.html Last accessed Mar. 1, 2007.
Office Action mailed Jan. 29, 2010 for Korean Patent Application No. 2008-7012765, 3 pages.
3GPP2: "cdma 2000 High Rate Packet Data Air Interface Specification", 3rd Generation Partnership Project 2, 3GPP2 C.S0024-A Version 2.0, pp. 8-25-8-28, Jul. 2005.
3GPP2: "cdma 2000 High Rate Packet Data Air Interface Specification", 3GPP2 C.S0024-A, Jul. 2005, Version 2.0, p. 8-26, 8-38.
3GPP2: "cdma 2000 High Rate Packet Data Air Interface Specification", 3GPP2 C.S0024-A, Sep. 2000, Version 2.0, p. 6-7-6-8.
3GPP2: "cdma2000 High Rate Packet Date Air Interface Specification", Version 2.0, 3GPP2 C.S0024-A, 8-68-8-69, Jul. 2005.
3GPP2 C.S0024-A, "cdma 2000 High Rate Packet Data Air Interface Specification", Version 2.0, 7-18, 8-29, 8-36, 8-38-8-39, 8-41, 8-155-8-156, 10-1, Jul. 2005.
3GPP2 C.S0024-A, "CDMA 2000 High Rate Packet Data Air Interface Specification", Version 2.0, 8-15, 8-43, Jul. 2005.
3GPP2 C.S0024-A, "CDMA 2000 High Rate Packet Data Air Interface Specification", Version 2.0, 8-151-8-155, Jul. 2005.
3GPP2 C.S0038-A: "Signaling Conformance Specification for High Rate Packet Data Air Interface"; Sep. 26, 2005.
Japanese Office Action dated Aug. 23, 2011, for Japanese Patent Application Serial No. 2008-538025, 3 pages.
Office Action for Chinese Patent Application No. 200680049746.5 dated Sep. 15, 2011, 5 pages.
IEEE Standard 802.16, IEEE Standard for Local and Metropolitan Area Networks, Part 16: Air Interface for Fixed Broadband Wireless Access Systems, pp. 1-895, Oct. 1, 2004.

MULTIPLE OTHER SECTOR INFORMATION COMBINING FOR POWER CONTROL IN A WIRELESS COMMUNICATION SYSTEM

CLAIM OF PRIORITY UNDER 35 U.S.C. §120

The present application for patent is a Continuation and claims priority to patent application Ser. No. 11/376,772 entitled "Multiple other sector information combining for power control in a wireless communication system" filed Mar. 15, 2006, and assigned to the assignee hereof and hereby expressly incorporated by reference herein.

BACKGROUND

I. Field

The present invention relates generally to communication, and more specifically to use of information from multiple sectors for power control in a wireless terminal.

II. Background

A wireless multiple-access communication system can simultaneously support communication for multiple wireless terminals. Each terminal communicates with one or more sectors via transmissions on the forward and reverse links. The forward link (or downlink) refers to the communication link from the sectors to the terminals, and the reverse link (or uplink) refers to the communication link from the terminals to the sectors.

Multiple terminals may simultaneously transmit on the reverse link by multiplexing their transmissions to be orthogonal to one another. The multiplexing attempts to achieve orthogonality among the multiple reverse link transmissions in time, frequency, and/or code domain. Complete orthogonality, if achieved, results in the transmission from each terminal not interfering with the transmissions from other terminals at a receiving sector. However, complete orthogonality among the transmissions from different terminals is often not realized due to channel conditions, receiver imperfections, and so on. The loss in orthogonality results in each terminal causing some amounts of interference to other terminals communicating with the same sector. Furthermore, the transmissions from terminals communicating with different sectors are typically not orthogonal to one another. Thus, each terminal may also cause interference to terminals communicating with nearby sectors. The performance of each terminal is then degraded by the interference from all other terminals in the system.

There is therefore a need in the art for techniques to mitigate the effects of interference so that improved performance may be achieved.

SUMMARY

Techniques for controlling transmit power for a data transmission from a wireless terminal in a manner to mitigate both "intra-sector" interference and "inter-sector" interference are described herein. The transmit power is adjusted such that the amount of intra-sector interference the terminal may cause to a "serving" sector and the amount of inter-sector interference the terminal may cause to "neighbor" sectors are both maintained within acceptable levels. (The terms in quote are described below.) The amount of inter-sector interference the terminal may cause may be roughly estimated based on (1) the total interference observed by each neighbor sector, (2) channel gains for the serving and neighbor sectors, (3) the current transmit power level used by the terminal, and (4) possibly other parameters. Each sector may broadcast a report (e.g., a value) indicative of the total interference observed by that sector. The channel gain for each sector may be estimated based on a pilot received from the sector. The transmit power may be adjusted in a probabilistic manner, a deterministic manner, or some other manner based on combining the interference reports from a number of sectors for a single transmit power adjustment.

In general, the transmit power may be decreased if high interference is observed by neighbor sectors and increased if low interference is observed. The transmit power may also be adjusted by a larger amount and/or more frequently if (1) the terminal is located closer to a neighbor sector observing high interference and/or (2) the current transmit power level is higher. The transmit power may be adjusted by a smaller amount and/or less frequently if (1) the terminal is located closer to the serving sector and/or (2) the current transmit power level is lower. The intra-sector interference caused by the terminal is maintained within an acceptable level by limiting the received signal quality (SNR) for the data transmission to be within a range of allowable SNRs.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
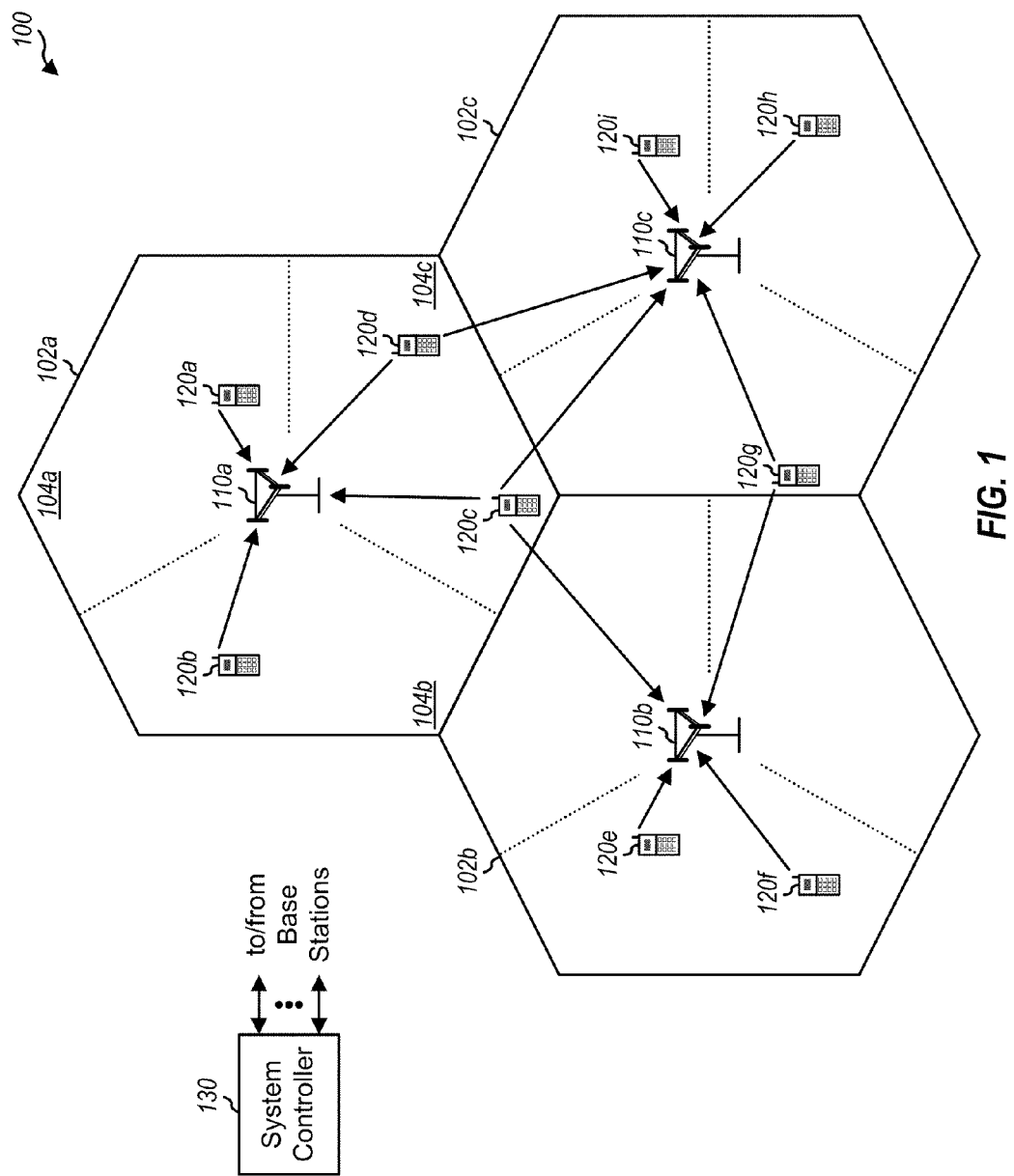
FIG. 1 shows a wireless multiple-access communication system.

FIG. 1 shows a wireless multiple-access communication system 100. System 100 includes a number of base stations 110 that support communication for a number of wireless terminals 120. Terminals 120 are typically dispersed throughout the system, and each terminal may be fixed or mobile. A terminal may also be referred to as a mobile station, a user equipment (UE), a wireless communication device, or some other terminology. A base station is a fixed station used for communicating with the terminals and may also be referred to as an access point, a Node B, or some other terminology. A system controller 130 couples to base stations 110, provides coordination and control for these base stations, and further controls the routing of data for the terminals served by these base stations.

Each base station 110 provides communication coverage for a respective geographic area 102. A base station and/or its coverage area may be referred to as a "cell", depending on the context in which the term is used. To increase capacity, the coverage area of each base station may be partitioned into multiple (e.g., three) sectors 104. Each sector is served by a base transceiver subsystem (BTS). The term "sector" can refer to a BTS and/or its coverage area, depending on the context in which the term is used. For a sectorized cell, the base station for that cell typically includes the BTSs for all sectors of that cell. For simplicity, in the following description, the term "base station" is used generically for both a fixed station that serves a cell and a fixed station that serves a sector. A "serving" base station or "serving" sector is one with which a terminal communicates. A "neighbor" base station or "neighbor" sector is one with which the terminal is not in communication. For simplicity, the following description assumes that each terminal communicates with one serving base station, although this is not a required limitation for the techniques described herein.

The power control techniques described herein may be used for various wireless communication systems. For example, these techniques may be used for a Time Division Multiple Access (TDMA) system, a Frequency Division Multiple Access (FDMA) system, an orthogonal frequency division multiple access (OFDMA) system, and so on. A TDMA system uses time division multiplexing (TDM), and transmissions for different terminals are orthogonalized by transmitting in different time intervals. An FDMA system uses frequency division multiplexing (FDM), and transmissions for different terminals are orthogonalized by transmitting in different frequency sub-carriers. TDMA and FDMA systems may also use code division multiplexing (CDM). In this case, transmissions for multiple terminals may be orthogonalized using different orthogonal (e.g., Walsh) codes even though they are sent in the same time interval or frequency sub-carrier. An OFDMA system utilizes orthogonal frequency division multiplexing (OFDM), which effectively partitions the overall system bandwidth into a number of (N) orthogonal frequency sub-carriers. These sub-carriers are also referred to as tones, bins, frequency channels, and so on. Each sub-carrier may be modulated with data. An OFDMA system may use any combination of time, frequency, and/or code division multiplexing. For clarity, the power control techniques are described below for an OFDMA system.

Figure 2:
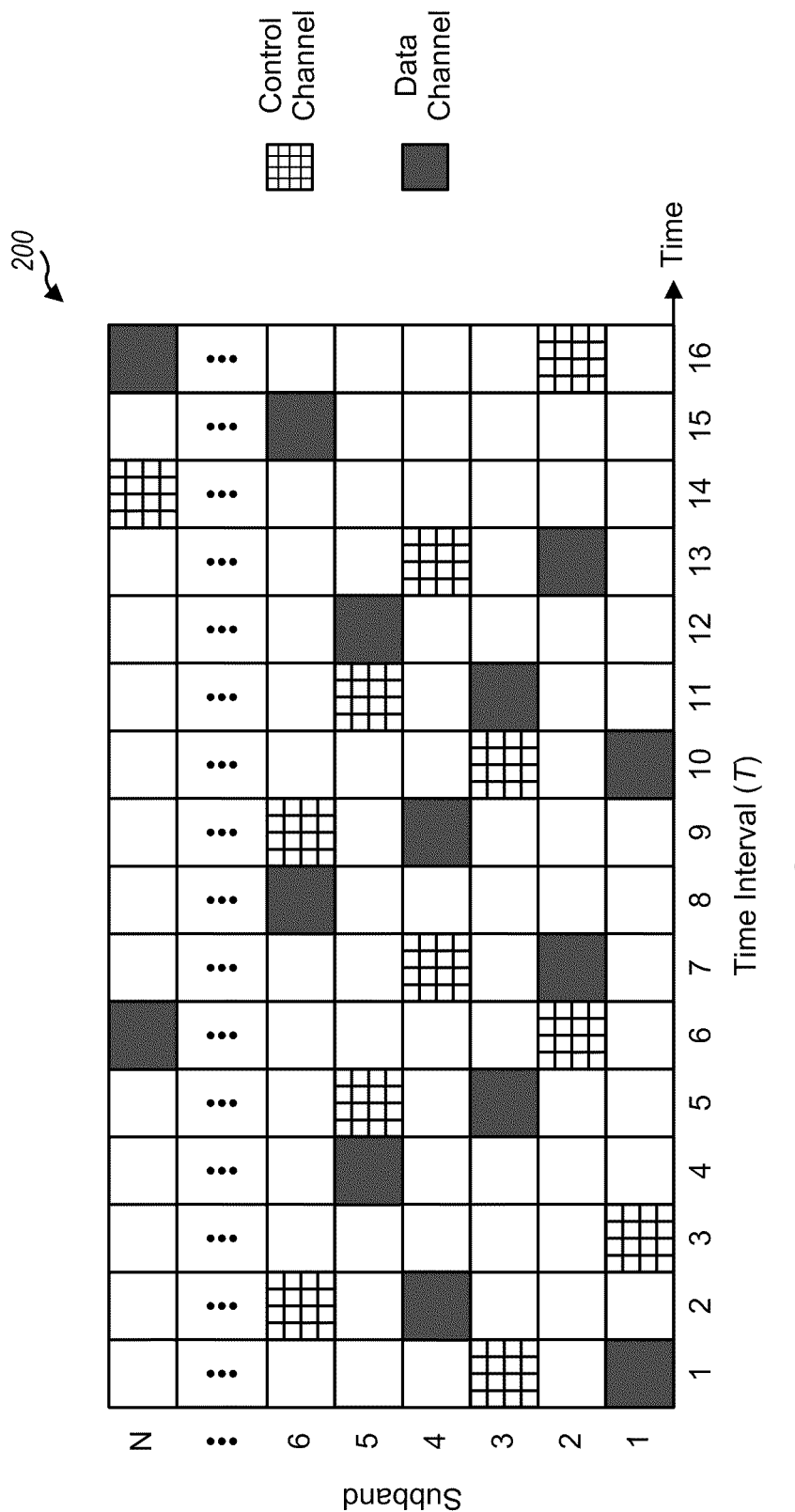
FIG. 2 shows frequency hopping on a time-frequency plane.

FIG. 2 illustrates frequency hopping (FH) on a time-frequency plane 200 for an OFDMA system. With frequency hopping, each traffic channel is associated with a specific FH sequence that indicates the particular sub-carrier(s) to use for that traffic channel in each time interval. The FH sequences for different traffic channels in each sector are orthogonal to one another so that no two traffic channels use the same sub-carrier in any time interval. The FH sequences for each sector are also pseudo-random with respect to the FH sequences for nearby sectors. Interference between two traffic channels in two sectors occurs whenever these two traffic channels use the same sub-carrier in the same time interval. However, the inter-sector interference is randomized due to the pseudo-random nature of the FH sequences used for different sectors.

Data channels may be assigned to active terminals such that each data channel is used by only one terminal at any given time. To conserve system resources, control channels may be shared among multiple terminals using, e.g., code division multiplexing. If the data channels are orthogonally multiplexed only in frequency and time (and not code), then they are less susceptible to loss in orthogonality due to channel conditions and receiver imperfections than the control channels.

The data channels thus have several key characteristics that are pertinent for power control. First, intra-cell interference on the data channels is minimal because of the orthogonal multiplexing in frequency and time. Second, inter-cell interference is randomized because nearby sectors use different FH sequences. The amount of inter-cell interference caused by a given terminal is determined by (1) the transmit power level used by that terminal and (2) the location of the terminal relative to the neighbor sectors.

For the data channels, power control may be performed such that each terminal is allowed to transmit at a power level that is as high as possible while keeping intra-cell and inter-cell interference to within acceptable levels. A terminal located closer to its serving sector may be allowed to transmit at a higher power level since this terminal will likely cause less interference to neighbor sectors. Conversely, a terminal located farther away from its serving sector and toward a sector edge may be allowed to transmit at a lower power level since this terminal may cause more interference to neighbor sectors. Controlling transmit power in this manner can potentially reduce the total interference observed by each sector while allowing "qualified" terminals to achieve higher SNRs and thus higher data rates.

Power control for the data channels may be performed in various manners to attain the goals noted above. For clarity, a specific embodiment of power control is described below. For this embodiment, the transmit power for a data channel for a given terminal may be expressed as:

$$P_{dch}(n) = P_{ref}(n) + \Delta P(n),  \quad\quad \text{Eq (1)}$$

where $P_{dch}(n)$ is the transmit power for the data channel for update interval n;
$P_{ref}(n)$ is a reference power level for update interval n; and
$\Delta P(n)$ is a transmit power delta for update interval n.

The power levels $P_{dch}(n)$ and $P_{ref}(n)$ and the transmit power delta $\Delta P(n)$ are given in units of decibels (dB).

The reference power level is the amount of transmit power needed to achieve a target signal quality for a designated transmission (e.g., on a control channel). Signal quality (denoted as SNR) may be quantified by a signal-to-noise ratio, a signal-to-noise-and-interference ratio, and so on. The reference power level and the target SNR may be adjusted by a power control mechanism to achieve a desired level of performance for the designated transmission, as described below. If the reference power level can achieve the target SNR, then the received SNR for the data channel may be estimated as:

$$SNR_{dch}(n) = SNR_{target} + \Delta P(n).  \quad\quad \text{Eq (2)}$$

Equation (2) assumes that the data channel and the control channel have similar interference statistics. This is the case, for example, if the control and data channels from different sectors may interfere with one another. The reference power level may be determined as described below.

The transmit power for the data channel may be set based on various factors such as (1) the amount of inter-sector interference the terminal may be causing to other terminals in neighbor sectors, (2) the amount of intra-sector interference the terminal may be causing to other terminals in the same sector, (3) the maximum power level allowed for the terminal, and (4) possibly other factors. Each of these factors is described below.

The amount of inter-sector interference each terminal may cause may be determined in various manners. For example, the amount of inter-sector interference caused by each terminal may be directly estimated by each neighbor sector and sent to the terminal, which may then adjust its transmit power accordingly based upon the combination of the inter-sector interference estimates transmitted. This individualized interference reporting may require extensive overhead signaling. For simplicity, the amount of inter-sector interference each terminal may cause may be roughly estimated based on (1) the total interference observed by each neighbor sector, (2) the channel gains for the serving and neighbor sectors, and (3) the transmit power level used by the terminal Quantities (1) and (2) are described below.

Each sector can estimate the total or average amount of interference observed by that sector. This may be achieved by estimating the interference power on each sub-carrier and computing an average interference power based on the interference power estimates for the individual sub-carriers. The average interference power may be obtained using various averaging techniques such as, for example, arithmetic averaging, geometric averaging, SNR-based averaging, and so on.

In certain aspects, arithmetic averaging of the interference at the sector may be utilized. In other aspects, geometric averaging may be utilized. In other aspects, SNR type averaging may be utilized. Different approaches and techniques of averaging are depicted and disclosed in co-pending U.S. patent application Ser. No. 10/897,463, which is incorporate by reference in its entirety.

Regardless of which averaging technique is used, each sector may filter the interference power estimates and/or the average interference power over multiple time intervals to improve the quality of the interference measurement. The filtering may be achieved with a finite impulse response (FIR) filter, an infinite impulses response (IIR) filter, or some other types of filter known in the art. The term "interference" may thus refer to filtered or unfiltered interference in the description herein.

Each sector may broadcast its interference measurements for use by terminals in other sectors. The interference measurements may be broadcast in various manners. In one embodiment, the average interference power (or the "measured" interference) is quantized to a predetermined number of bits, which are then sent via a broadcast channel. In another embodiment, the measured interference is broadcast using a single bit that indicates whether the measured interference is greater than or below a nominal interference threshold. In yet another embodiment, the measured interference is broadcast using two bits. One bit indicates the measured interference relative to the nominal interference threshold. The other bit may be used as a distress/panic bit that indicates whether the measured interference exceeds a high interference threshold. The interference measurements may also be sent in other manners.

For simplicity, the following description assumes the use of a single other-sector interference (OSI) bit to provide interference information. Each sector may set its OSI value (OSIB) as follows: '0' if $I_{meas,m}(n) < I_{target}$; '1' if $I_{meas,m}(n) \geq I_{target}$; and if $I_{meas,m}(n) \geq I_{target} + N$, where $I_{target}$ is the nominal interference threshold, $I_{meas,m}$ is the measured interference, and N is some upper bound threshold indicating an upper bound threshold indicative of excessive interference.

Alternatively, each sector may obtain a measured interference-over-thermal (IOT), which is a ratio of the total interference power observed by the sector to the thermal noise power. The total interference power may be computed as described above. The thermal noise power may be estimated by turning off the transmitter and measuring the noise at the receiver. A specific operating point may be selected for the system and denoted as $IOT_{target}$. A higher operating point allows the terminals to use higher transmit powers (on average) for the data channels. However, a very high operating point may not be desirable since the system can become interference limited, which is a situation whereby an increase in transmit power does not translate to an increase in received SNR. Furthermore, a very high operating point increases the likelihood of system instability. In any case, each sector may set its OSI value as follows: '0' if $IOT_{meas,m}(n) < IOT_{target}$; '1' if $IOT_{meas,m}(n) \geq IOT_{target}$; and '2' if $IOT_{meas,m}(n) \geq IOT_{target} + N$, where $IOT_{meas,m}(n)$ is the measured IOT for sector m in time interval n and N is some upper bound threshold indicative of excessive interference.

For both cases, the OSI value may be used for power control as described below. It should be noted that the OSI value, may have any desired size and have more, or less, than three states.

Each terminal can estimate the channel gain (or propagation path gain) for each sector that may receive a reverse link transmission from the terminal. The channel gain for each sector may be estimated by processing a pilot received from the sector via the forward link, estimating the received pilot strength/power, and filtering pilot strength estimates over time (e.g., with a filter having a time constant of several hundred milli-seconds) to remove the effects of fast fading and so on. If all sectors transmit their pilots at the same power level, then the received pilot strength for each sector is indicative of the channel gain between that sector and the terminal. The terminal may form a channel gain ratio vector, $\underline{G}$, as follows:

$$\underline{G} = [r_1(n) r_2(n) \ldots r_M(n)], \quad \text{Eq (3)}$$

where $$r_i(n) = \frac{g_s(n)}{g_{ni}(n)} \frac{p_{ni}(n)}{p_s(n)}, \quad \text{Eq (4)}$$

$g_s(n)$ is the channel gain between the terminal and the serving sector;
$g_{ni}(n)$ is the channel gain between the terminal and neighbor sector i;
$p_s(n)$ is the relative power of a signal, e.g. pilot, originating from the serving sector and terminating at the terminal;
$p_{ni}(n)$ is relative power of a signal, e.g. pilot, originating from the neighbor sector i and terminating at the terminal; and
$r_i(n)$ is the channel gain ratio for neighbor sector i.

Since distance is inversely related to channel gain, the channel gain ratio $g_s(n)/g_{ni}(n)$ may be viewed as a "relative distance" that is indicative of the distance to a neighbor sector i relative to the distance to the serving sector. In general, the channel gain ratio for a neighbor sector, $r_i(n)$, decreases as the terminal moves toward the sector edge and increases as the terminal moves closer to the serving sector. The channel gain ratio vector, $\underline{G}$, may be used for power control as described below.

Although the data channels for each sector are multiplexed such that they are orthogonal to one another, some loss in orthogonality may result from inter-carrier interference (ICI), inter-symbol interference (ISI), and so on. This loss of orthogonality causes intra-sector interference. To mitigate intra-sector interference, the transmit power of each terminal may be controlled such that the amount of intra-sector interference that this terminal may cause to other terminals in the same sector is maintained within an acceptable level. This may be achieved, for example, by requiring the received SNR for the data channel for each terminal to be within a predetermined SNR range, as follows:

$$SNR_{dch}(n) \in [SNR_{min}, SNR_{max}], \qquad \text{Eq (5)}$$

where $SNR_{min}$ is the minimum received SNR allowable for a data channel; and $SNR_{max}$ is the maximum received SNR allowable for a data channel.

The minimum received SNR ensures that all terminals, especially those located near the sector edge, can achieve a minimum level of performance. Without such a constraint, terminals located near the sector edge may be forced to transmit at an extremely low power level, since they often contribute a significant amount of inter-sector interference.

If the received SNRs for the data channels for all terminals are constrained to be within the range [$SNR_{min}$, $SNR_{max}$], then the amount of intra-sector interference caused by each terminal due to a loss of orthogonality may be assumed to be within the acceptable level. By limiting the received SNRs to be within this SNR range, there can still be as much as ($SNR_{max}$−$SNR_{min}$) dB difference in received power spectral density between adjacent sub-carriers (assuming that similar amounts of inter-sector interference are observed on the sub-carriers, which is true, e.g., if the control and data channels hop randomly so that the control and data channels from different sectors may collide with one another). A small SNR range improves the robustness of the system in the presence of ICI and ISI. An SNR range of 10 dB has been found to provide good performance in most operating scenarios. Other SNR ranges may also be used.

If the transmit power for the data channel is determined as shown in equation (1), then the received SNR for the data channel may be maintained within the range of [$SNR_{min}$, $SNR_{max}$] by constraining the transmit power delta, $\Delta P(n)$, to be within a corresponding range, as follows:

$$\Delta P(n) \in [\Delta P_{min}, \Delta P_{max}], \qquad \text{Eq (6)}$$

where $\Delta P_{min}$ is the minimum transmit power delta allowable for a data channel, and $\Delta P_{max}$ is the maximum transmit power delta allowable for a data channel.

In particular, $\Delta P_{min} = SNR_{min} - SNR_{target}$ and $\Delta P_{max} = SNR_{max} - SNR_{target}$. In another embodiment, the transmit power $P_{dch}(n)$ may be constrained to be within a range that is determined, for example, based on the received signal power for the data channel. This embodiment may be used, for example, if interference power is statistically different among the sub-carriers.

The transmit power for the data channel for each terminal may then be adjusted based on the following parameters:

The OSI value broadcast by each sector;

The channel gain ratio vector, $\underline{G}$, computed by the terminal;

The range of received SNRs allowable for the data channels, [$SNR_{min}$, $SNR_{max}$], or equivalently the range of allowable transmit power deltas, [$\Delta P_{min}$, $\Delta P_{max}$]; and The maximum power level, $P_{max}$, allowed for the terminal, which may set by the system or the power amplifier within the terminal Parameters 1) and 2) relate to the inter-sector interference caused by the terminal Parameter 3) relates to the intra-sector interference caused by the terminal.

In general, a terminal located close to a neighbor sector that reports high interference may transmit with a lower transmit power delta so that its received SNR is closer to $SNR_{min}$. Conversely, a terminal located close to its serving sector may transmit with a higher transmit power delta so that its received SNR is closer to $SNR_{max}$. A gradation of received SNRs may be observed for the terminals in the system based on their proximity to the serving sectors. A scheduler at each sector can take advantage of the distribution of received SNRs to achieve high throughput while ensuring fairness for the terminals.

The transmit power for the data channel may be adjusted in various manners based on the four parameters noted above. The power control mechanism does not need to maintain equal SNR for all terminals, especially in an orthogonal system like an OFDMA system, where terminals closer to a sector may transmit at higher power levels without causing much problem to other terminals. For clarity, a specific embodiment for adjusting transmit power is described below. For this embodiment, each terminal monitors the OSI values broadcast by neighbor sectors and then combines the OSI values from multiple neighbor sectors to determine whether to increase, decrease, or maintain its reverse link transmit power.

An algorithm which adjusts the terminal transmit power based on OSI values from M neighbor sectors should be provided such that the OSIB of a neighbor sector that has a lower channel gain should have more effect on the power adjustment compared to the OSIB of a neighbor sector which has a higher channel gain. Further, if there is only one neighbor sector, the algorithm should be equivalent to using only the OSIB of that sector. Additionally, if there are two neighbor sectors which have approximately the same channel gain, there should be a power decrease if any sector indicates interference levels above its threshold, e.g. OSIB=1, or 2, from any sector. That is, if any of the "close" neighbor sectors experience excessive interference, then the terminal should decrease its power to help the neighbor sector to decrease its interference.

The combined OSI value thus determines the direction in which to adjust the transmit power. The amount of transmit power adjustment for each terminal may be dependent on (1) the current transmit power level (or the current transmit power delta) of the terminal and (2) the channel gain ratio for the sectors from which the OSI values were combined. An exemplary, method is depicted in FIG. 3.

Figure 3:
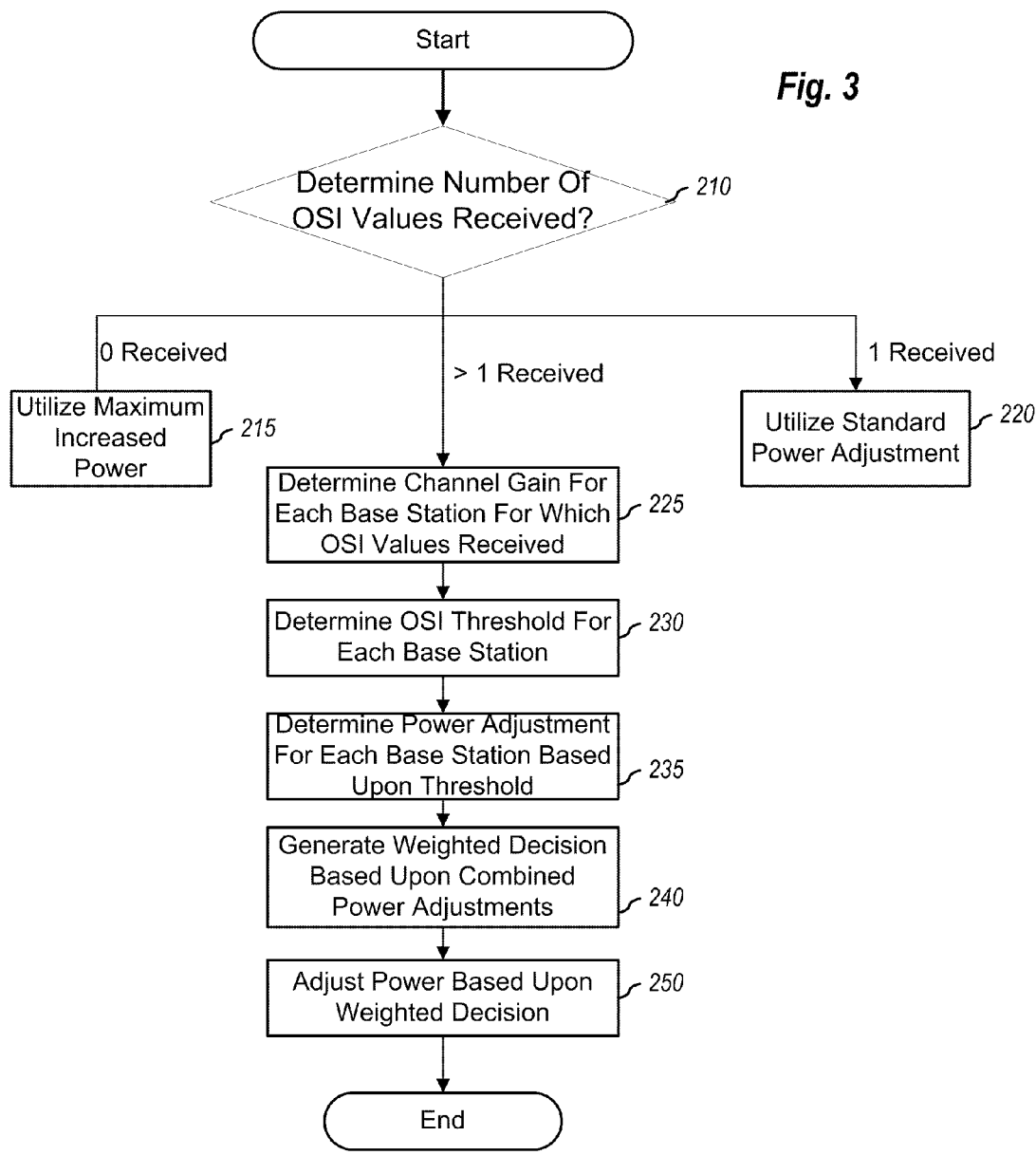
FIG. 3 shows a method of adjusting transmit power by combining interference indications from multiple sectors.

FIG. 3 shows a method of adjusting transmit power by combining interference indications from multiple sectors. Initially, a determination as to a number of sectors for which OSI values detected, block 210. If the number is zero, then the maximum available value for $\Delta P(n)$ may be utilized, block 215. If the number is one, then a power adjustment algorithm may be utilized the single OSI value, block 220. Various, exemplary approaches, are depicted and discussed with respect to FIGS. 4A and 4B. However, other approaches and techniques may be utilized.

If the number is two or more, a channel gain ratio is determined for each sector to be utilized for the power adjustment, block 225. These may be for all of the sectors from which the terminal can receive signals, e.g. pilots, or a subset of these sectors. The determination may be based upon the following:

$$ChanDiff_i = \frac{RxPower_{RL,SS}}{TransmitPower_{RL,SS}} \times \frac{TransmitPower_i}{RxPower_i} \qquad \text{Eq. (7)}$$

where $RxPower_{RL,SS}$ is the power of pilots received at the terminal for the reverse link serving sector;

TransmitPower$_{RL,SS}$ is the power of pilots transmitted from the reverse link serving sector, which is a system parameter;

RxPower$_i$ is the power of pilots received at the terminal for the ith sector; and TransmitPower$_i$ is the power of pilots transmitted from the ith sector; sector, which is a system parameter.

It should be noted that the power of the pilots transmitted, may be provided in a message header or may be constant throughout the system. For example, if the pilots are acquisition pilots, then the power may be the maximum power allowable at the sector for some number of symbol periods.

The terminal then determines a threshold for each OSI value received, block 230. The threshold for each sectors OSI value may be determined as follows:

$$Threshold_i = \begin{cases} \max\left\{\begin{array}{c}UpDecisionThresholdMin, \\ (1-a)b_i\end{array}\right\} & \text{if } OSI_i = 0 \\ \max\left\{\begin{array}{c}UpDecisionThresholdMin, \\ (1-a)b_i\end{array}\right\} & \text{if } OSI_i = 1 \\ 1 & \text{if } OSI_i = 2 \end{cases} \quad \text{Eq. (8)}$$

where UpDecisionThresholdMin and DownDecisionThresholdMin are predetermined system parameters which may be fixed or may be updated during any communication session. The variables a and $b_i$ may be determined as follows:

$$a_i = \frac{\min\{RDCHGain, RDCHGainMax\} - RDCHGainMin}{RDCHGainMax - RDCHGainMin}, \quad \text{Eq. (9)}$$

and $$b_i = \frac{\min\{ChanDiff_i, ChanDiffMax\} - ChanDiffMin}{ChanDiffMax - ChanDiffMin}, \quad \text{Eq. (10)}$$

where RDCHGainMax is the maximum gain, RDCHGainMin is the minimum gain, ChanDiffMax is the maximum channel gain, and ChanDiffMin is the minimum channel gain. These are predetermined system parameters which may be fixed or may be updated during any communication session.

The terminal may then determine whether each threshold indicates that the power should be increase, decreased, or maintained for that OSI value, block 235. This determination may be made as follows:

$$Decision_i = \quad \text{Eq. (11)}$$

$$\begin{cases} UpDecisionValue & \text{if } x_i \leq DecisionThreshold_i \\ & \text{and } OSI_i = 0 \\ -DownDecisionValue & \text{if } x_i \leq DecisionThreshold_i \\ & \text{and } OSI_i = 1 \text{ or } 2 \\ 0 & \text{otherwise} \end{cases}$$

where $0 \leq x_i \leq 1$, UpDecisionValue, and DownDecisionValue are predetermined system parameters which may be fixed or may be updated during any communication session.

The terminal then combines the channel gains and indications of power adjustments, based upon some weighting, to generate a weighted decision, block 240. The weighted decision may be determined as shown below:

$$D_w = \frac{\sum_{i=1}^{OSIMonitorSetSize} \frac{1}{ChanDiff_i} Decision_i}{\sum_{i=1}^{OSIMonitorSetSize} \frac{1}{ChanDiff_i}} \quad \text{Eq. (12)}$$

Where ChanDiff$_i$ is the channel gain for each terminal, OSIMonitor Set Size the number of sectors for which OSI values have been received, or are being utilized, and Decision$_i$ is the indicated power adjustment for each terminal.

This combined determination may then be used to adjust the power, block 250. Various, exemplary approaches, are depicted and discussed with respect to FIGS. 4A and 4B. However, other approaches and techniques may be utilized.

In certain other aspects, additional functions may be utilized to determine the power adjustment. For example, a terminal may find the sector with the highest channel gain and determine to the OSI value to utilize based upon whether strongest pilot transmissions and OSI value were received from that sector. For example, a terminal may make this determination as follows:

$$OSI2SequenceNum = \quad \text{Eq. (13)}$$

$$\begin{cases} OSI2SequenceNum + 1, & \begin{array}{l}\text{if } PilotPNCurrent = \\ PilotPNStrongest \text{ and} \\ OSI2SequenceNum < \\ OSI2SequenceNumMax - 1 \\ \text{and } OSIStrongest = 2\end{array} \\ OSI2SequenceMax, & \begin{array}{l}\text{if } PilotPNCurrent = \\ PilotPNStrongest \text{ and} \\ OSI2SequenceNum = \\ OSI2SequencNumMax - 1 \\ \text{and } OSIStrongest = 2\end{array} \\ 2, & \begin{array}{l}\text{if } PilotPNCurrent \neq \\ PilotPNStrongest \text{ and} \\ OSI2SequenceNum = \\ OSI2SequencNumMax - 1 \\ \text{and } OSIStrongest = 2\end{array} \\ 1, & \text{otherwise} \end{cases}$$

$$PilotPNStrongest = \begin{cases} PilotPNCurrent, & \text{if } OSIStrongest = 2 \\ -1, & \text{otherwise} \end{cases} \quad \text{Eq. (14)}$$

where OSI2SequenceNumMax is a predetermined value, PilotPNCurrent is the current sector with the current largest channel gain, PilotPNStrongest is the prior sector with the largest channel gain, and OSI2SequenceNum is the number of consecutive times the current sector has sent the largest OSI value for the terminal.

The access terminal may then increase its ΔP(n) by a predetermined gain value if D$_W$ is greater than or equal to a threshold, decrease its ΔP(n) by a predetermined gain, which may be the same or different than the gain used for increasing, or decrease its ΔP(n) by decrease gain multiplied by the number of times the current sector has the largest channel gain, if D$_W$ is less than or equal to a second threshold. Furthermore, the ΔP(n) is generally limited to being between a minimum and maximum gain, which are predetermined parameters.

In certain aspects, the transmit power may be adjusted in a deterministic manner, a probabilistic manner, or some other manner. For deterministic adjustment, the transmit power is adjusted in a pre-defined manner based on the pertinent parameters. For probabilistic adjustment, the transmit power has a certain probability of being adjusted, with the probability being determined by the pertinent parameters. Exemplary deterministic and probabilistic adjustment schemes are described below.

Figure 4A:
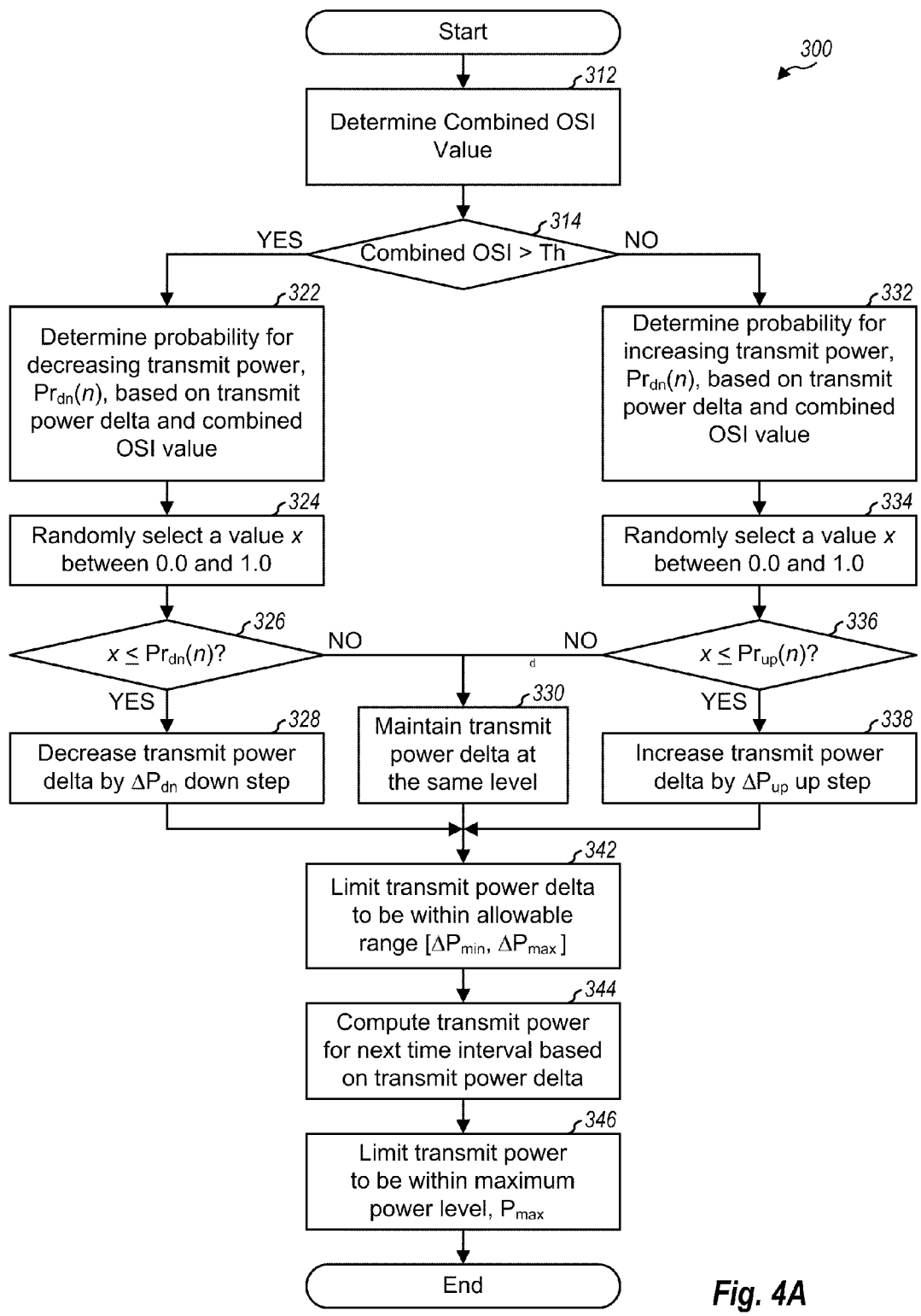
FIG. 4A shows a process for adjusting transmit power in a probabilistic manner.

FIG. 4A shows a flow diagram of a process 300 for adjusting transmit power in a probabilistic manner. Process 300 may be performed by each terminal and for each time interval in which an OSI value is transmitted from at least one neighbor sector. Initially, the terminal determines the combined OSI value o (block 312). The terminal then determines whether the OSI value is '1' or '0', or a '2', (block 314). In the case where it is '2', the power would be decreased according to a maximum value.

If the OSI value is '1', indicating a higher than nominal interference level, then the terminal determines a probability for decreasing the transmit power, $Pr_{dn}(n)$ (block 322). $Pr_{dn}(n)$ may be computed based on the current transmit power delta, $\Delta P(n)$, and the channel gain ratio for the strongest neighbor sector, $r_{osib}(n)$, or a combined channel gain value as described below. The terminal then randomly selects a value x between 0.0 and 1.0 (block 324). In particular, x is a random variable uniformly distributed between 0.0 and 1.0. If the randomly selected value x is less than or equal to the probability $Pr_{dn}(n)$, as determined in block 326, then the terminal decreases its transmit power delta by a $\Delta P_{dn}$ down step (block 328), as follows:

$$\Delta P(n+1) = \Delta P(n) - \Delta P_{dn}. \quad \text{Eq (15)}$$

Otherwise, if x is greater than $Pr_{dn}(n)$, then the terminal maintains the transmit power delta at the current level (block 330). From blocks 328 and 330, the process proceeds to block 342.

If the OSI value is '0' in block 314, indicating a lower than nominal interference level, then the terminal determines a probability for increasing the transmit power, $Pr_{up}(n)$, e.g., based on $\Delta P(n)$ and $r_{osib}(n)$, as also described below (block 332). The terminal then randomly selects a value x between 0.0 and 1.0 (block 334). If the randomly selected value x is less than or equal to the probability $Pr_{up}(n)$, as determined in block 336, then the terminal increases its transmit power delta by an $\Delta P_{up}$ up step (block 338), as follows:

$$\Delta P(n+1) = \Delta P(n) + \Delta P_{up}. \quad \text{Eq (16)}$$

The step sizes for $\Delta P_{up}$ and $\Delta P_{dn}$ may both be set to the same suitable value (e.g., 0.25 dB, 0.5 dB, 1.0 dB, and so on). If x is greater than $Pr_{up}(n)$ in block 336, then the terminal maintains the transmit power delta at the same level (block 330). From blocks 330 and 338, the process proceeds to block 342.

In block 342, the terminal limits the transmit power delta, $\Delta P(n+1)$, to be within the allowable range $[\Delta P_{min}, \Delta P_{max}]$. The terminal then computes the transmit power for the next time interval, $P_{dch}(n+1)$, based on the transmit power delta, $\Delta P(n+1)$, and the reference power level, $P_{ref}(n+1)$, for the next time interval, as shown in equation (1) (block 344). The terminal then limits the transmit power $P_{dch}(n+1)$ to be within the maximum power level (block 346), as follows:

$$P_{dch}(n+1) = \begin{cases} P_{dch}(n+1), & \text{if } P_{dch}(n+1) \leq P_{max}, \\ P_{max}, & \text{otherwise.} \end{cases} \quad \text{Eq (17)}$$

The terminal uses the transmit power $P_{dch}(n+1)$ for the next time interval.

The probabilities $Pr_{dn}(n)$ and $Pr_{up}(n)$ may be a function of the transmit power delta, $\Delta P(n)$, and the channel gain ratio for the strongest neighbor sector, $r_{osib}(n)$, or a combined channel gain value. Various functions may be used for $Pr_{dn}(n)$ and $Pr_{up}(n)$. Each function may have a different impact on various power control characteristics such as (1) the convergence rate of the transmit power adjustment and (2) the distribution of transmit power deltas for the terminals in the system.

In an embodiment, the probabilities $Pr_{dn}(n)$ and $Pr_{up}(n)$ may be defined as follows:

$$Pr_{up}(n) = \max(Pr_{up,min}, [1 - Pr_{\Delta P}(n)] \cdot [1 - Pr_{gain}(n)]), \quad \text{Eq (18a)}$$

and $$Pr_{dn}(n) = \max(Pr_{dn,min}, Pr_{\Delta P}(n) \cdot Pr_{gain}(n)), \quad \text{Eq (18b)}$$

where $$Pr_{\Delta P}(n) = \frac{\min(\Delta P(n), \Delta \tilde{P}_{max}) - \Delta \tilde{P}_{min}}{\Delta \tilde{P}_{max} - \Delta \tilde{P}_{min}}, \quad \text{Eq (18c)}$$

$$Pr_{gain}(n) = \frac{\min(r_{osib}(n), r_{max}) - r_{min}}{r_{max} - r_{min}}, \quad \text{Eq (18d)}$$

$Pr_{\Delta P}(n)$ is a probability related to the transmit power level;
$Pr_{gain}(n)$ is a probability related to the channel gain ratio for the strongest neighbor sector;
$\Delta \tilde{P}_{max}$, and $\Delta \tilde{P}_{min}$, $r_{max}$, and $r_{min}$ are normalizing constants selected to achieve the desired power control characteristics;
$Pr_{up,min}$ is a minimum probability for upward adjustment of transmit power; and
$Pr_{dn,min}$ is a minimum probability for downward adjustment of transmit power.

For the embodiment shown by equation set (18), $Pr_{dn}(n)$ and $Pr_{up}(n)$ are joint probabilities determined by the transmit power level and the channel gain ratio. The minimum probabilities $Pr_{up,min}$ and $Pr_{dn,min}$ improve steady-state characteristics and promote some movement for points in the extremes (e.g., very high or very low channel gain values). The probabilities $Pr_{dn}(n)$ and $Pr_{up}(n)$ derived as shown in equation set (15) conform to the general transmit power adjustment rules discussed above, e.g. paragraph [0070]. The probabilities $Pr_{dn}(n)$ and $Pr_{up}(n)$ may also be derived with some other functions, and this is within the scope of the invention.

Figure 4B:
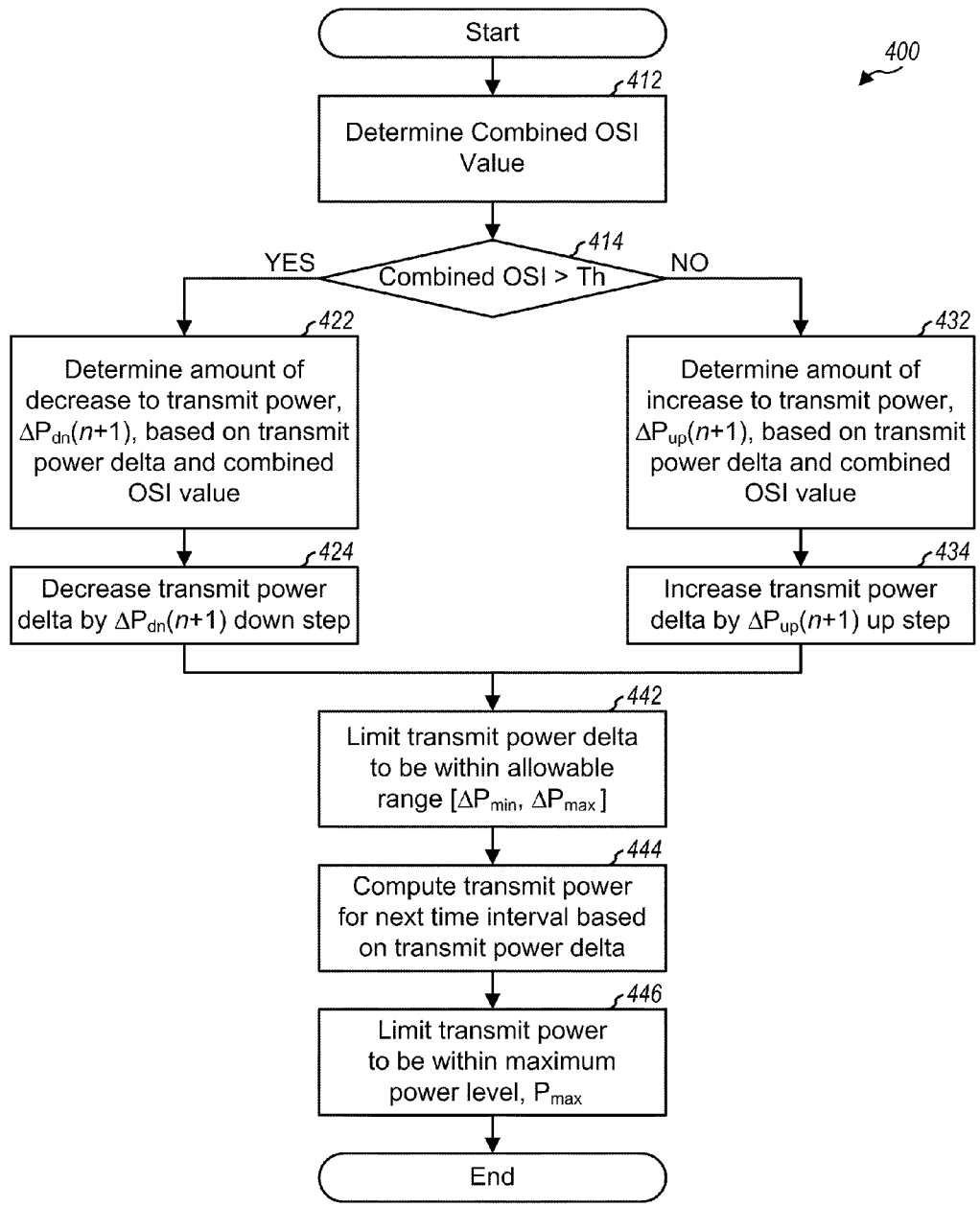
FIG. 4B shows a process for adjusting transmit power in a deterministic manner.

FIG. 4B shows a flow diagram of a process 400 for adjusting transmit power in a deterministic manner. Process 400 may also be performed by each terminal and for each time interval in which an OSI value is transmitted. The terminal processes the combined OSI value (block 412) and determines whether the OSI value is '1' or '0', or '2', (block 414). If the OSI value is '1', then the terminal determines the amount of decrease in transmit power, $\Delta P_{dn}(n+1)$, for the next time interval (block 422). The variable down step size may be determined based on the current transmit power delta, $\Delta P(n)$, and the channel gain ratio, $r_{osib}(n)$. The terminal then decreases the transmit power delta by $\Delta P_{dn}(n+1)$ (block 424). Otherwise, if the OSI value is '0', then the terminal determines the amount of increase in transmit power, $\Delta P_{up}(n+1)$, for the next time interval, e.g., based on $\Delta P(n)$ and $r_{osib}(n)$ (block 432). The terminal then increases the transmit power delta by $\Delta P_{up}(n+1)$ (block 434). After blocks 424 and 434, the terminal limits the transmit power delta for the next time interval, $\Delta P(n+1)$, to be within the allowable range of $[\Delta P_{min}, \Delta P_{max}]$ (block 442) and further computes and limits the transmit power for the next time interval to be within the maximum power level (blocks 444 and 446).

The variable step sizes $\Delta P_{dn}(n+1)$ and $\Delta P_{up}(n+1)$ and may be determined based on a predetermined function of $\Delta P(n)$ and $r_{osib}(n)$, e.g., similar to the function expressed by equation set (15). The variable step sizes may be defined to be proportional to $\Delta P(n)$ and inversely proportional to $r_{osib}(n)$. The adjustment probabilities and variable step sizes may also be determined based on a look-up table of different probabilities and step size values for different $\Delta P(n)$ and $r_{osib}(n)$ values, or by some other means.

FIGS. 4A and 4B show exemplary embodiments for adjusting transmit power in a probabilistic and a deterministic manner, respectively. For the probabilistic embodiment shown in FIG. 4A, the adjustment probability is determined based on the parameters $\Delta P(n)$ and $r_{osib}(n)$, and fixed-size up and down steps are used for transmit power adjustment. For the deterministic embodiment shown in FIG. 4B, the adjustment probability is fixed at 1.0, and the up and down step sizes are determined based on the parameters $\Delta P(n)$ and $r_{osib}(n)$. Various modifications may also be made to these embodiments. For example, variable up and down step sizes may also be used for the probabilistic embodiment. As another example, fixed-size up and down steps may be used for the deterministic embodiment.

The power delta $\Delta P(n)$ for the data channel may be adjusted based on the OSI value, the channel gain, the prior power delta $\Delta P(n-1)$, the range of allowable power deltas, and the maximum power level for the terminal, as described above. In general, the power delta $\Delta P(n)$ may be adjusted based on any one or any combination of parameters. Other parameters that may be used to adjust $\Delta P(n)$ include the current transmit power $P_{dch}(n)$, a peak-to-average backoff factor $\Delta P_{bo}$, a "designated" set of sectors that may potentially observe high interference from the terminal, and so on. The peak-to-average backoff factor may be determined by the number of sub-carriers used by the terminal for transmission, and a higher value may be used for $\Delta P_{bo}$ if more sub-carriers are used for transmission. The transmit power for the data channel may be constrained to be less than Pmax minus this backoff factor, or $P_{dch}(n) \leq (P_{max} - \Delta P_{bo})$.

The transmit power for the terminal may also be adjusted based on other parameters, criteria, and information. The terminal may further adjust the transmit power by different amounts and/or in different manners based on all of the information available for the sector(s) to be considered for transmit power adjustment.

Figure 5:
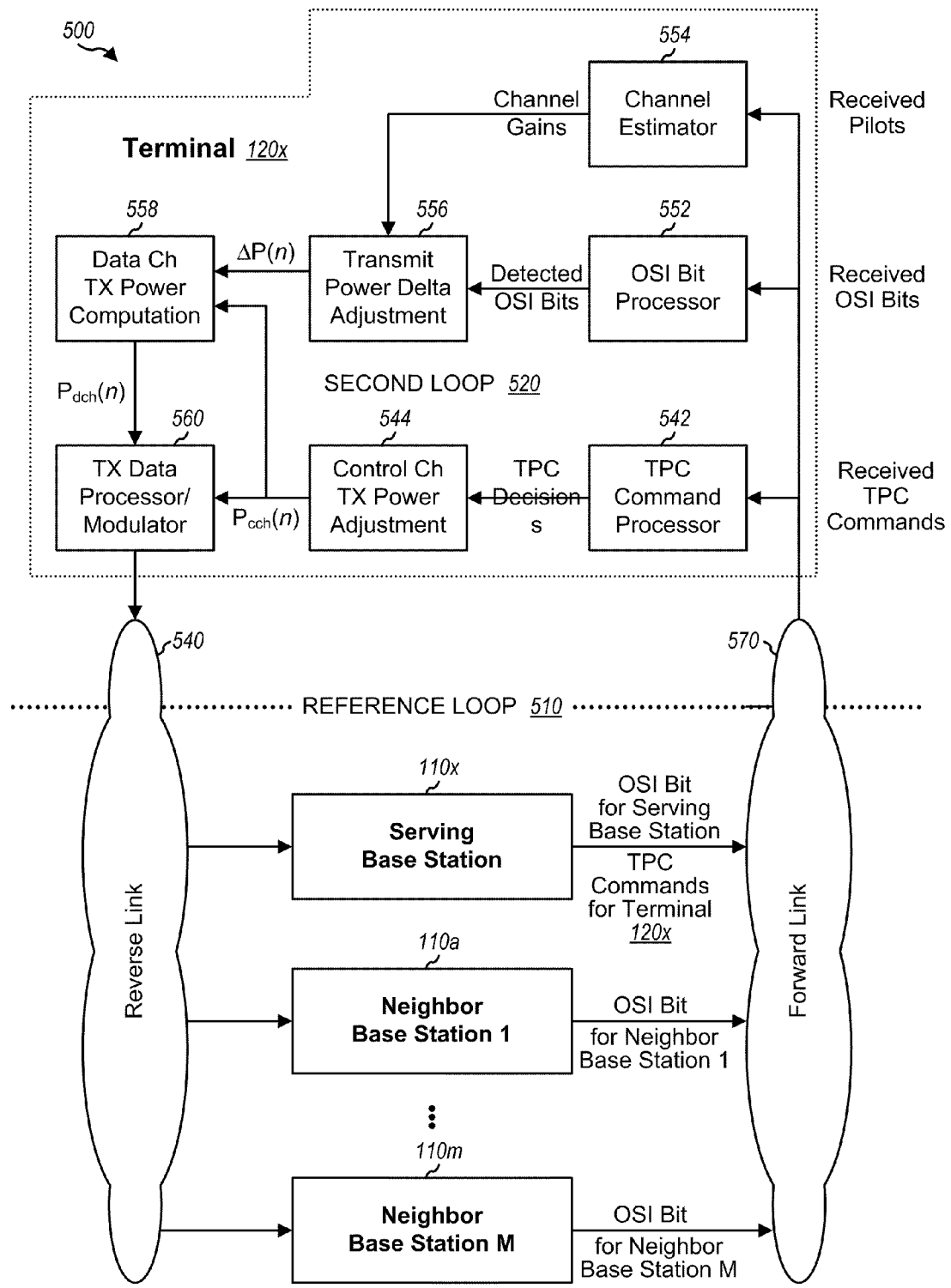
FIG. 5 shows a power control mechanism for a data channel.

FIG. 5 shows a power control mechanism 500 that may be used to adjust the transmit power for a terminal 120x in system 100. Terminal 120x communicates with a serving sector 110x and may cause interference to neighbor sectors 110a through 110m (albeit by different amounts). Power control mechanism 500 includes a reference loop 510 and a second loop 520. Reference loop 510 operates between terminal 120x and serving sector 110x. Second loop 520 operates between terminal 120x and neighbor sectors 110a through 110m and possibly serving sector 110x. For simplicity, FIG. 5 shows only the portion of loops 510 and 520 residing at terminal 120x.

Reference loop 510 adjusts the transmit power for a control channel (or some other traffic channel) and attempts to maintain the received SNR for this control channel, as measured at serving sector 110x, as close as possible to a target SNR. For reference loop 510, serving sector 110x estimates the received SNR for the control channel, compares the received SNR against the target SNR, and generates transmit power control (TPC) commands based on the comparison results, as described below. Each TPC command may be either (1) an UP command to direct an increase in transmit power for the control channel or (2) a DOWN command to direct a decrease in transmit power. Serving sector 110x transmits the TPC commands on the forward link (cloud 570) to terminal 120x.

Terminal 120x receives and processes the forward link transmission from serving sector 110x and provides "received" TPC commands to a TPC command processor 542. Each received TPC command is a noisy version of a TPC command transmitted by serving sector 110x. Processor 542 detects each received TPC command and obtains a "TPC decision", which may be (1) an UP decision if the received TPC command is deemed to be an UP command or (2) a DOWN decision if the received TPC command is deemed to be an DOWN command. A control channel transmit (TX) power adjustment unit 544 adjusts the transmit power for the control channel, $P_{cch}(n)$ based on the TPC decisions from TPC command processor 542. For example, unit 544 may increase $P_{cch}(n)$ by a $\Delta P_{cch,up}$ up step for each UP decision and decrease $P_{cch}(n)$ by a $\Delta P_{cch,dn}$ down step for each DOWN decision. A TX data processor/modulator 560 sets the transmit power for the control channel to the $P_{cch}(n)$ level indicated by unit 544. The transmission on the control channel is sent to serving sector 110x.

Due to path loss, fading, and multipath effects on the reverse link (cloud 540), which typically vary over time and especially for a mobile terminal, the received SNR for the control channel continually fluctuates. Reference loop 510 attempts to maintain the received SNR at or near the target SNR in the presence of changes in the reverse link channel condition.

Second loop 520 adjusts the transmit power for a data channel (or some other traffic channel) such that a power level that is as high as possible is used for the data channel while keeping inter-sector and intra-sector interference to within acceptable levels. For second loop 520, an OSI value processor 552 receives and processes the OSI values broadcast by neighbor sectors 110a through 110m and possibly serving sector 110x. OSI value processor 552 provides detected OSI values from the sectors to a transmit power delta adjustment unit 556. A channel estimator 554 receives pilots from the serving and neighbor sectors, estimates the channel gain for each sector, and provide the estimated channel gains for all sectors to unit 556. Unit 556 determines the channel gain ratios for the neighbor sectors and identifies the strongest neighbor sector. Unit 556 further adjusts the transmit power delta $\Delta P(n)$ for the data channel based on either a combined OSI value, or a combined OSI value and the channel gain ratio for the strongest neighbor or a combined channel gain ratio, as described above. Unit 556 may implement process 300 or 400 and may adjust $\Delta P(n)$ in a probabilistic or deterministic manner, or as otherwise discussed with respect to FIG. 4A. In general, unit 556 may adjust the transmit power delta $\Delta P(n)$ based on detected OSI values and/or other pertinent information for any number of sectors, which may include the serving and/or neighbor sectors.

A data channel transmit power computation unit 558 receives the control channel transmit power, $P_{cch}(n)$, which is used as the reference power level, $P_{ref}(n)$, and the transmit power delta, $\Delta P(n)$. Unit 558 computes the transmit power $P_{dch}(n)$ for the data channel based on $P_{cch}(n)$ and $\Delta P(n)$. Unit 560 sets the transmit power for the data channel to the $P_{dch}(n)$ level indicated by unit 558. The transmission on the data channel is sent to serving sector 110*x*. The transmissions on the data and control channels may cause interference to neighbor sectors 110*a* through 110*m*.

Each sector 110 receives transmissions from terminals on the reverse link, estimates the interference observed by that sector, compares the measured interference against the nominal interference threshold, sets the OSI value accordingly based on the comparison result, and broadcasts the OSI value on the forward link.

Reference loop 510 and second loop 520 may operate concurrently but may be updated at different rates, with loop 510 being a faster loop than loop 520. The update rates for the two loops may be selected to achieve the desired power control performance. As an example, reference loop 510 may be updated at a rate of, e.g., 150 times per second, and second loop may be updated at a rate of, e.g., 10 to 20 times per second. Reference loop 510 and second loop 520 may operate on transmissions sent on the control channel and the data channel, respectively. The control and data channels may be assigned different sub-carriers in each hop period, as shown in FIG. 2. In this case, reference loop 510 and second loop 520 may operate simultaneously on transmissions sent on different sub-carriers. The control channel may also be multiplexed with the data channel (e.g., using TDM and/or CDM) and sent on the same sub-carriers.

Figure 6:
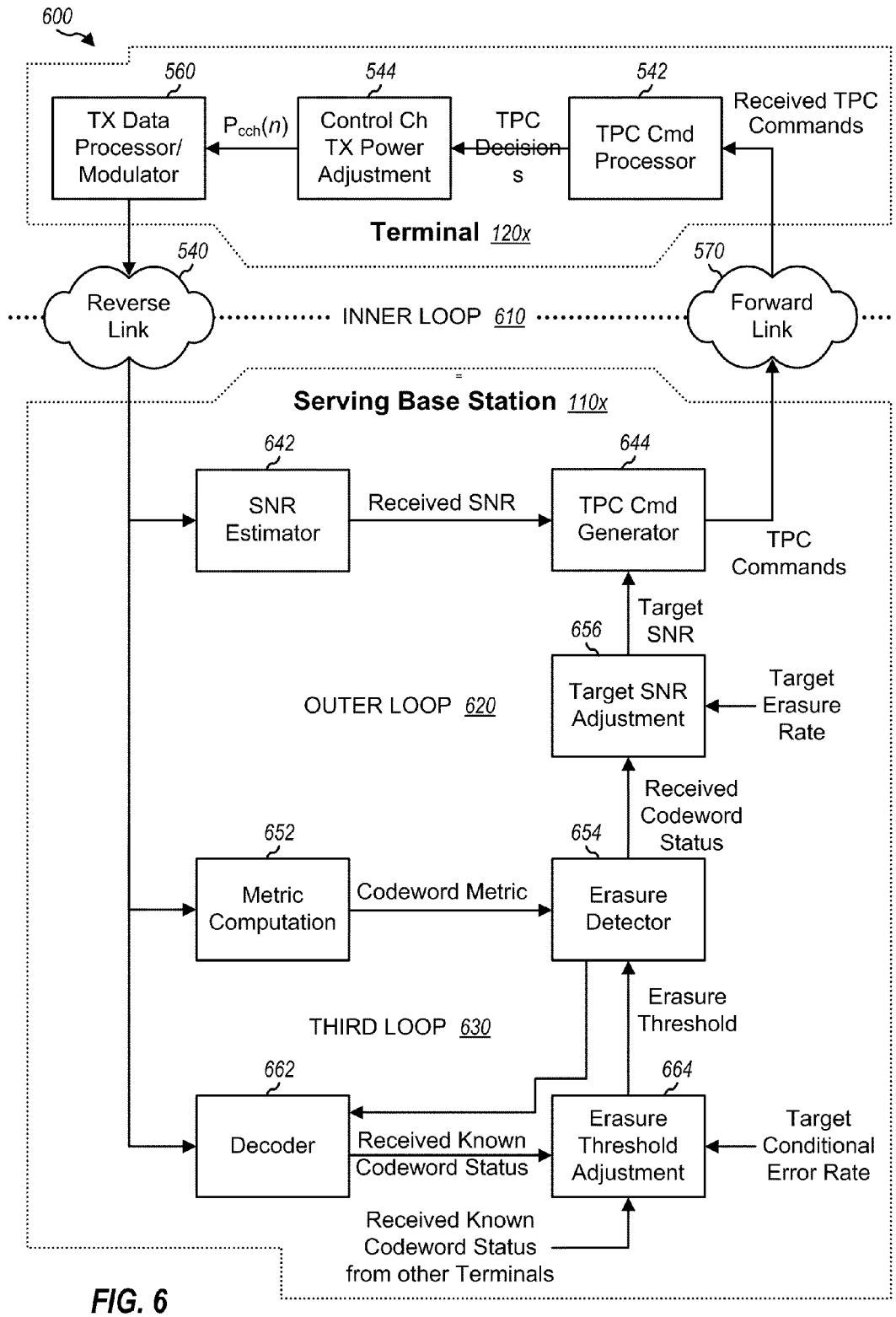
FIG. 6 shows a power control mechanism for a control channel.

FIG. 6 shows a power control mechanism 600 that may be used for the control channel. Power control mechanism 600 (which may be used for reference loop 510 in FIG. 5) includes an inner loop 610, an outer loop 620, and a third loop 630. Inner loop 610 attempts to maintain the received SNR for the control channel as close as possible to the target SNR. For inner loop 610, an SNR estimator 642 at serving sector 110*x* estimates the received SNR for the control channel and provides the received SNR to a TPC command generator 644. Generator 644 compares the received SNR against the target SNR and generates TPC commands based on the comparison results. Serving sector 110*x* transmits the TPC commands on the forward link (cloud 570) to terminal 120*x*. Terminal 120*x* receives and processes the TPC commands from serving sector 110*x* and adjusts the transmit power for the control channel, as described above for FIG. 5.

Data may be sent in blocks on the control channel, and each data block may be coded with a block code to obtain a corresponding codeword (or coded data block). An error detection code may not be used for the control channel. In this case, the serving sector may perform erasure detection for each received codeword to determine whether the codeword is erased or non-erased. An erased codeword may be deemed to be unreliable and processed accordingly (e.g., discarded). The erasure detection may be performed by computing a metric for each received codeword, comparing the computed metric against an erasure threshold, and declaring the received codeword to be erased or non-erased based on the comparison result.

Outer loop 620 adjusts the target SNR such that a target erasure rate, $Pr_{erasure}$, is achieved for the control channel. The target erasure rate indicates a desired probability (e.g., 10%) of declaring a received codeword as erased. A metric computation unit 652 computes the metric for each received codeword. An erasure detector 654 performs erasure detection for each received codeword based on its computed metric and the erasure threshold and provides the status of the received codeword (erased or non-erased) to a target SNR adjustment unit 656. Unit 656 then adjusts the target SNR for the control channel as follows:

$$SNR_{target}(k+1) = \begin{cases} SNR_{target}(k) + \Delta SNR_{up}, & \text{for an erased codeword,} \\ SNR_{target}(k) - \Delta SNR_{dn}, & \text{for a non-erased codeword,} \end{cases} \quad \text{Eq (19)}$$

where $SNR_{target}(k)$ is the target SNR for outer loop update interval k;
$\Delta SNR_{up}$ is an up step size for the target SNR; and
$\Delta SNR_{dn}$ is a down step size for the target SNR.

The $\Delta SNR_{up}$ and $\Delta SNR_{dn}$ step sizes may be set based on the following:

$$\Delta SNR_{up} = \Delta SNR_{dn} \cdot \left(\frac{1 - Pr_{erasure}}{Pr_{erasure}}\right). \quad \text{Eq (20)}$$

Third loop 630 adjusts the erasure threshold such that a target conditional error rate, $Pr_{error}$, is achieved for the control channel. The target conditional error rate indicates a desired probability of a received codeword being decoded in error when deemed to be non-erased. A small $Pr_{error}$ (e.g., 1%) corresponds to high confidence in the decoding results for non-erased codewords. Terminal 110*x* and/or other terminals in communication with serving sector 110*x* may transmit known codewords on the control channel periodically or when triggered. Units 652 and 654 perform erasure detection for each received known codeword in the same manner as for a received codeword. For each received known codeword deemed to be non-erased, a decoder 662 decodes the received known codeword and determines whether the decoded data block is correct or in error. Decoder 662 provides the status of each received known codeword, which may be erased, "good", or "bad". A good codeword is a received known codeword deemed to be non-erased and decoded correctly. A bad codeword is a received known codeword deemed to be non-erased but decoded in error. An erasure threshold adjustment unit 664 adjusts the erasure threshold based on the status of each received known codeword, as follows:

$$TH_{erasure}(l+1) = \begin{cases} TH_{erasure}(l) + \Delta TH_{up}, & \text{for a good codeword,} \\ TH_{erasure}(l) - \Delta TH_{dn}, & \text{for a bad codeword, and} \\ TH_{erasure}(l), & \text{for an erased codeword,} \end{cases} \quad \text{Eq (21)}$$

where $TH_{erasure}(l)$ is the erasure threshold for third loop update interval l;
$\Delta TH_{up}$ is an up step size for the erasure threshold; and
$\Delta TH_{dn}$ is a down step size for the erasure threshold.

Equation (21) assumes that a lower erasure threshold increases the likelihood of a received codeword being declared erased.

The $\Delta TH_{up}$ and $\Delta TH_{dn}$ step sizes may be set based on the following:

$$\Delta TH_{dn} = \Delta TH_{up} \cdot \left(\frac{1 - Pr_{error}}{Pr_{error}}\right). \quad \text{Eq (22)}$$

Inner loop 610, outer loop 620, and third loop 630 are typically updated at different rates. Inner loop 610 is the fastest loop of the three loops, and the transmit power for the control channel may be updated at a particular rate (e.g., 150 times per second). Outer loop 620 is the next fastest loop, and the target SNR may be updated whenever a codeword is received on the control channel. Third loop 630 is the slowest loop, and the erasure threshold may be updated whenever a known codeword is received on the control channel. The update rates for the three loops may be selected to achieve the desired performance for erasure detection and power control for the control channel. Power control mechanism 600 is further described in commonly assigned U.S. patent application Ser. No. 10/890,717, entitled "Robust Erasure Detection and Erasure-Rate-Based Closed Loop Power Control."

For clarity, specific embodiments have been described above for various aspects of power control. Numerous other embodiments may also be derived based on the description provided herein. Some examples are given below.

The same range of allowable transmit power deltas, $[\Delta P_{min}, \Delta P_{max}]$, may be used for all terminals in the system. Different ranges of $[\Delta P_{min}, \Delta P_{max}]$ may also be used for different terminals, e.g., depending on their locations. For example, terminals with smaller channel gain ratio for the strongest neighbor sectors may use a smaller range of transmit power deltas (e.g., the same $\Delta P_{min}$ but a smaller $\Delta P_{max}$) than terminals located closer to the serving sectors.

The reference power level, $P_{ref}(n)$, used to derive the data channel transmit power, $P_{dch}(n)$, may be set to the transmit power for another power-controlled channel, as described above. The reference power level may also be obtained in other manners, e.g., estimated based on the channel gain for the serving sector. The data channel transmit power may also be adjusted directly, instead of via the transmit power delta. The serving sector may provide feedback to inform the terminal whether the data channel transmit power is within an allowable range.

Each sector may broadcast its interference information to all terminals, if the interference observed by the sector is randomized, e.g., with frequency hopping. If the sectors have more specific interference information, then the transmit powers of the terminals may be adjusted in a manner to take advantage of this information. For example, each terminal may be assigned one or more specific sub-carriers for data transmission (without frequency hopping). A sector may then observe different amounts of interference on different sub-carriers. Terminals causing large amounts of interference may be specifically identified based on their assigned sub-carriers, and the transmit powers of these terminals may be reduced accordingly.

The supported data rate for each terminal is determined by the received SNR for the data channel. This received SNR, for the embodiments described above, is dependent on (1) the target SNR associated with the reference power level and (2) the transmit power delta, $\Delta P(n)$, used by the terminal. The transmit power delta may be autonomously adjusted by the terminal without any input from the serving sector, as described above. The terminal may send the transmit power delta, the received SNR for the data channel, the supported data rate for the data channel, or equivalent information to the serving sector. The terminal may also send the maximum number of sub-carriers, $N_{sb,max}(n)$, that the terminal can support at the current transmit power delta, the desired quality of service (QoS), the buffer size, and so on. To reduce the amount of signaling, the terminal may send $\Delta P(n)$ and $N_{sb,max}(n)$ every few update intervals, via in-band signaling on the data channel, and so on.

A scheduler at/for the serving sector may use all of the information reported by the terminal to allocate resources to the terminal and to schedule the terminal for data transmission on the reverse link. The scheduler may allocate $N_{sb,max}(n)$ sub-carriers, less than $N_{sb,max}(n)$ sub carriers, or more than $N_{sb,max}(n)$ sub-carriers to the terminal. If the scheduler allocates more than $N_{sb,max}(n)$ sub-carriers, then the terminal can scale down the transmit power delta accordingly. For example, if $2N_{sb,max}(n)$ sub-carriers are allocated, then $\Delta P(n)$ may be scaled down by a factor of two.

The power control may be performed by each terminal based on various pieces of information the terminal obtains from its serving sector and neighbor sectors, as described above. The power control may also be performed by each sector for all terminals in communication with the sector. For example, each sector may obtain an interference report (e.g., the OSI value) for each neighbor sector, e.g., via signaling between the sectors or transmissions from the terminals. Each sector may also obtain the channel gains determined by each terminal for the serving and neighbor sectors. Each sector may then compute the transmit power delta for each terminal based on the interference reports and the channel gains applicable for that terminal and may sent the transmit power delta to the terminal. Each terminal may then adjust its transmit power using the transmit power delta received from its serving sector. Alternatively, each sector may compute and send the transmit power for each terminal. The availability of the transmit power deltas for all terminals in communication with each sector can expedite the scheduling for the terminals.

The techniques described herein may be used for power control of various types of traffic channels (e.g., data and control channels). These techniques are also well suited for a hybrid automatic retransmission (H-ARQ) scheme. With H-ARQ, each coded packet is partitioned into multiple (Nbl) subblocks, and one subblock is transmitted at a time for the coded packet. As each subblock for a given coded packet is received via the reverse link, the serving sector attempts to decode and recover the packet based on all subblocks received thus far for the packet. The serving sector is able to recover the packet based on a partial transmission because the subblocks contain redundant information that is useful for decoding when the received SNR is low but may not be needed when the received SNR is high. The serving sector transmits an acknowledgment (ACK) if the packet is decoded correctly, and the terminal may terminate the transmission of the packet early upon receiving the ACK.

With H-ARQ, each coded packet may be transmitted in a variable amount of time until decoded correctly. A conventional power control mechanism that adjusts the received SNR for the data channel based on packet error rate (PER) would reduce the transmit power for the data channel to a low level such that a target PER is achieved with all Nbl subblocks transmitted for each coded packet. This may severely reduce system throughput. The techniques described herein allow a high transmit power level to be used even with variable duration transmission supported by H-ARQ.

Figure 7:
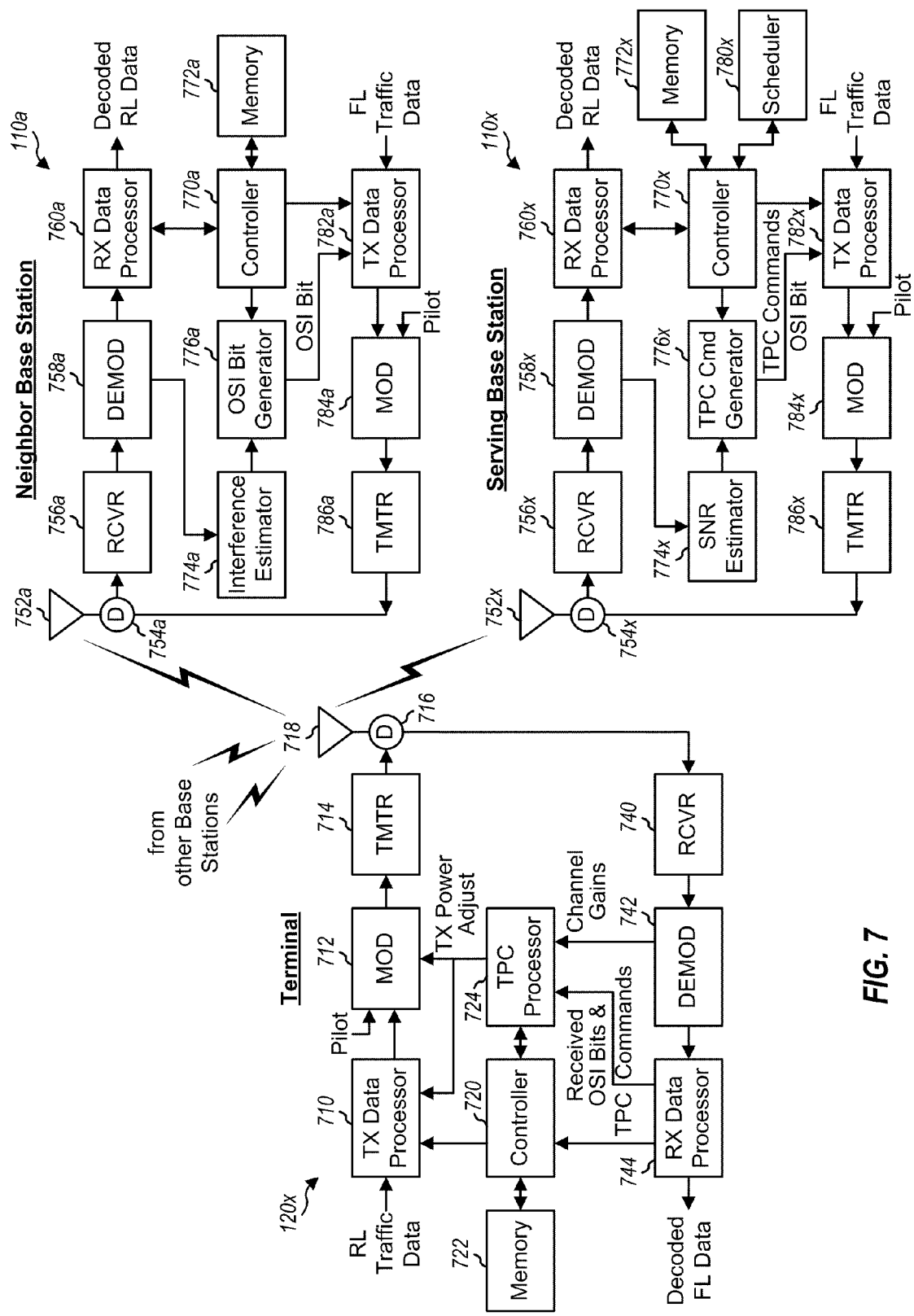
FIG. 7 shows a terminal, a serving sector, and a neighbor sector.

FIG. 7 shows a block diagram of an embodiment of terminal 120*x*, serving sector 110*x*, and neighbor sector 110*a*. On the reverse link, at terminal 120*x*, a TX data processor 710 processes (e.g., codes, interleaves, and modulates) reverse link (RL) traffic data and provides modulation symbols for the traffic data. TX data processor 710 also processes control data (e.g., a channel quality indicator) from a controller 720 and provides modulation symbols for the control data. A modulator (MOD) 712 processes the modulation symbols for the traffic and control data and pilot symbols and provides a sequence of complex-valued chips. The processing by TX data processor 710 and modulator 712 is dependent on the system. Modulator 712 performs OFDM modulation if the system utilizes OFDM. A transmitter unit (TMTR) 714 conditions (e.g., converts to analog, amplifies, filters, and frequency upconverts) the sequence of chips and generates a reverse link signal, which is routed through a duplexer (D) 716 and transmitted via an antenna 718.

At serving sector 110x, the reverse link signal from terminal 120x is received by an antenna 752x, routed through a duplexer 754x, and provided to a receiver unit (RCVR) 756x. Receiver unit 756x conditions (e.g., filters, amplifies, and frequency downconverts) the received signal and further digitizes the conditioned signal to obtain a stream of data samples. A demodulator (DEMOD) 758x processes the data samples to obtain symbol estimates. A receive (RX) data processor 760x then processes (e.g., deinterleaves and decodes) the symbol estimates to obtain decoded data for terminal 120x. RX data processor 760x also performs erasure detection and provides to a controller 770x the status of each received codeword used for power control. The processing by demodulator 758x and RX data processor 760x is complementary to the processing performed by modulator 712 and TX data processor 710, respectively.

The processing for a forward link transmission may be performed similarly to that described above for the reverse link. The processing for the transmissions on the forward and reverse links is typically specified by the system.

For reverse link power control, at serving sector 110x, an SNR estimator 774x estimates the received SNR for terminal 120x and provides the received SNR to a TPC command (cmd) generator 776x. Generator 776x also receives the target SNR and generates TPC commands for terminal 120x. The TPC commands are processed by a TX data processor 782x and a modulator 784x, conditioned by a transmitter unit 786x, routed through duplexer 754x, and transmitted via antenna 752x to terminal 120x. At neighbor sector 110a, an interference estimator 774a estimates the interference observed by the sector and provides the measured interference to an OSI value generator 776a. Generator 776a also receives the nominal interference threshold and generates the OSI value for sector 110a. The OSI value is processed and broadcast to terminals in the system. Generator 776a may also generate a panic bit or some other type of interference report.

At terminal 120x, the forward link signals from the serving and neighbor sectors are received by antenna 718. The received signal is routed through duplexer 716, conditioned and digitized by a receiver unit 740, and processed by a demodulator 742 and an RX data processor 744 to obtain received TPC commands and received OSI values. A channel estimator within demodulator 742 estimates the channel gain for each sector. A TPC processor 724 detects the received TPC commands to obtain TPC decisions, which are used to update the transmit power for the control channel. TPC processor 724 also adjusts the transmit power for the data channel based on the received OSI values for neighbor sectors, the channel gains for the serving and neighbor sectors, and the transmit powers for the data and control channels, as described above. TPC processor 724 (or controller 720) may implement process 300 in FIG. 4A or process 400 in FIG. 4B. TPC processor 724 provides transmit power adjustment controls for the control and data channels. Processor 710 and/or modulator 712 receive the controls from TPC processor 724 and adjust the transmit powers for control and data channels.

Controllers 720, 770x, and 770a direct the operations of various processing units within terminal 120x and sector 110x and 110a, respectively. These controllers may also perform various functions for power control for the reverse link. For example, controllers 720 and 770x may implement the processing units shown in FIGS. 5 and 6 for terminal 120x and sector 110x, respectively, and the processes described with respect to FIGS. 3, 4A and 4B. Memory units 722, 772x, and 772a store data and program codes for controllers 720, 770x, and 770a, respectively. A scheduler 780x schedules terminals for data transmission to/from serving sector 110x.

The power control techniques described herein may be implemented by various means. For example, these techniques may be implemented in hardware, software, or a combination thereof. For a hardware implementation, the processing units used to perform power control may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the power control techniques may be implemented with modules (e.g., procedures, functions, and so on) that perform the functions described herein. The software codes may be stored in a memory unit (e.g., memory unit 722 in FIG. 7) and executed by a processor (e.g., controller 720). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing power control at a wireless terminal in a wireless communication system, the method comprising:
    obtaining, for at least two sectors, an indication of interference observed by the sector, each sector being a neighbor sector not designated to receive a data transmission sent by the wireless terminal or a serving sector designated to receive the data transmission sent by the wireless terminal;
    combining each indication of interference received from the at least two sectors according to a weighting scheme based on a channel gain relationship for each sector with respect to a serving sector; and
    adjusting transmit power for the data transmission based on the combined indications.

2. The method of claim 1, wherein the indication comprises a first bit that indicates whether the interference observed by the sector is above or below a first interference threshold.

3. The method of claim 2, wherein the indication further comprises a second bit that indicates whether the interference observed by the sector exceeds a second interference threshold that is higher than the first interference threshold.

4. The method of claim 1, wherein the serving sector comprises a reverse link serving sector.

5. The method of claim 1, further comprising determining a threshold value for each indication and wherein weighting comprises weighting each threshold value according to the channel gain relationship.

6. The method of claim 1, wherein channel gains for each of the at least two sectors and the serving sectors are estimated based on pilots received from the sectors, respectively.

7. The method of claim 1, wherein adjusting the transmit power comprises adjusting based on the combined indication and a probability.

8. The method of claim 7, further comprising determining the probability for adjusting the transmit power upward or downward based on the channel gain relationships for each of the at least two sectors.

9. The method of claim 8, wherein the probability is determined further based on a current level of the transmit power for the data transmission.

10. The method of claim 8, wherein the transmit power is adjusted in a fixed-size step and in accordance with the determined probability.

11. The method of claim 1, further comprising determining a step size for adjusting the transmit power based on the estimated channel gain relationships and wherein adjusting comprises adjusting based on the combined indications and the step size.

12. The method of claim 11, wherein the step size is determined further based on a current level of the transmit power for the data transmission.

13. An apparatus operable to perform power control at a wireless terminal in a wireless communication system, comprising:
a processor configured to obtain, for at least two sectors, an indication of interference observed by the sector, each sector being a neighbor sector not designated to receive a data transmission sent by the wireless terminal or a serving sector designated to receive the data transmission sent by the wireless terminal, to combine each indication of interference received from the at least two sectors according to a weighting scheme based on a channel gain relationship for each sector with respect to a serving sector, and to adjust a transmit power for data transmission based on the combined indication of interference received from the at least two sectors; and
a memory coupled with the processor.

14. The apparatus of claim 13, wherein the indication comprises a first bit that indicates whether the interference observed by the sector is above or below a first interference threshold.

15. The apparatus of claim 14, wherein the indication further comprises a second bit that indicates whether the interference observed by the sector exceeds a second interference threshold that is higher than the first interference threshold.

16. The apparatus of claim 13, wherein the serving sector comprise a reverse link serving sector.

17. The apparatus of claim 13, wherein the processor is configured to determine a threshold value for each indication and weight each threshold value according to the channel gain relationship.

18. The apparatus of claim 13, wherein the processor is configured to adjust the transmit power based on the combined indication and a probability.

19. The apparatus of claim 18, wherein the processor is configured to determine the probability, for adjusting the transmit power upward or downward, based on the channel gain relationships for each of the at least two sectors.

20. The apparatus of claim 19, wherein the processor is configured to determine the probability based on a current level of the transmit power for the data transmission.

21. The apparatus of claim 19, wherein the processor is configured to adjust the transmit power in a fixed-size step and in accordance with the determined probability.

22. The apparatus of claim 13, wherein the processor is configured to determine a step size and to adjust based on the combined indications and the step size.

23. The apparatus of claim 22, wherein the processor is configured to determine the step size based on a current level of the transmit power for the data transmission.

24. An apparatus operable to perform power control at a wireless terminal in a wireless communication system, comprising:
means for obtaining, for at least two sectors, an indication of interference observed by the sector, each sector being a neighbor sector not designated to receive a data transmission sent by the wireless terminal or a serving sector designated to receive the data transmission sent by the wireless terminal;
means for combining each indication of interference received from the at least two sectors according to a weighting scheme based on a channel gain relationship for each sector with respect to a serving sector; and
means for adjusting transmit power for the data transmission based on the combined indications.

25. The apparatus of claim 24, wherein the indication comprises a first bit that indicates whether the interference observed by the sector is above or below a first interference threshold.

26. The apparatus of claim 25, wherein the indication further comprises a second bit that indicates whether the interference observed by the sector exceeds a second interference threshold that is higher than the first interference threshold.

27. The apparatus of claim 24, further comprises means for determining a threshold value for each indication and wherein the means for weighting comprises means for weighting each threshold value according to the channel gain relationship.

28. The apparatus of claim 24, further comprising means for estimating channel gains based on pilots received.

29. The apparatus of claim 24, wherein the means for adjusting the transmit power comprises means for adjusting based on the combined indication and a probability.

30. The apparatus of claim 24, wherein the means for adjusting the transmit power comprises means for determining a step size for adjusting the transmit power based on the estimated channel gain relationships and adjusting based on the combined indications and the step size.

31. A non-transitory computer memory unit comprising code, which, when executed by a processor, direct the processor to perform power control at a wireless terminal in a wireless communication system, the computer readable storage medium comprising:
code for obtaining, for at least two sectors, an indication of interference observed by the sector, each sector being a neighbor sector not designated to receive a data transmission sent by the wireless terminal or a serving sector designated to receive the data transmission sent by the wireless terminal;
code for combining each indication of interference received from the at least two sectors according to a weighting scheme based on a channel gain relationship for each sector with respect to a serving sector; and
code for adjusting transmit power for the data transmission based on the combined indications.

32. The computer readable storage medium of claim 31, wherein the indication comprises a first bit that indicates whether the interference observed by the sector is above or below a first interference threshold.

33. The computer readable storage medium of claim 32, wherein the indication further comprises a second bit that indicates whether the interference observed by the sector exceeds a second interference threshold that is higher than the first interference threshold.

34. The computer readable storage medium of claim 31, further comprising code for determining a threshold value for each indication and wherein the code for weighting comprises code for weighting each threshold value according to the channel gain relationship.

35. The computer readable storage medium of claim 31, further comprising code for estimating channel gains based on pilots received.

36. The computer readable storage medium of claim 31, wherein the code for adjusting the transmit power comprises code for adjusting based on the combined indication and a probability.

37. The computer readable storage medium of claim 31, wherein the code for adjusting the transmit power comprises code for determining a step size for adjusting the transmit power based on the estimated channel gain relationships and adjusting based on the combined indications and the step size.

\* \* \* \* \*